United States Patent
Hogo et al.

(10) Patent No.: US 9,316,529 B2
(45) Date of Patent: Apr. 19, 2016

(54) OPTICAL SENSOR DEVICE AND IMAGE DISPLAY DEVICE

(75) Inventors: Hidekazu Hogo, Ishikawa (JP); Kentaro Kojima, Ishikawa (JP); Kenichi Amemiya, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 237 days.

(21) Appl. No.: 14/126,373

(22) PCT Filed: Dec. 1, 2011

(86) PCT No.: PCT/JP2011/077756
§ 371 (c)(1),
(2), (4) Date: Dec. 13, 2013

(87) PCT Pub. No.: WO2012/172707
PCT Pub. Date: Dec. 20, 2012

(65) Prior Publication Data
US 2014/0091210 A1 Apr. 3, 2014

(30) Foreign Application Priority Data

Jun. 14, 2011 (JP) ................................ 2011-132694

(51) Int. Cl.
*G01J 1/04* (2006.01)
*G06F 1/16* (2006.01)

(52) U.S. Cl.
CPC ............. *G01J 1/0403* (2013.01); *G06F 1/1601* (2013.01); *G09G 2320/0693* (2013.01); *G09G 2360/145* (2013.01)

(58) Field of Classification Search
CPC ................................. G09G 5/00; G01J 1/0403
USPC ........... 250/216, 239, 221; 345/207; 315/149, 315/169.3, 307
See application file for complete search history.

(56) References Cited

U.S. PATENT DOCUMENTS 7,288,896 B2 * 10/2007 Edelbrock ............ G09G 3/3406
315/149
2009/0009501 A1 1/2009 Shiba

FOREIGN PATENT DOCUMENTS

| JP | 2003-174651 A | 6/2003 |
| JP | 2005-208548 A | 8/2005 |
| JP | 2008-102305 A | 5/2008 |
| JP | 2011-22226 A | 2/2011 |
| JP | 2011064613 A | 3/2011 |

OTHER PUBLICATIONS

International Search Report mailed Mar. 6, 2012, as issued in corresponding International Patent Application No. PCT/JP2011/077756, filed Dec. 1, 2011 (with English translation—2 pages).
Extended European Search Report in PCT/JP2011/077756 dated Mar. 28, 2014.

* cited by examiner

*Primary Examiner* — Kevin Pyo
(74) *Attorney, Agent, or Firm* — Maier & Maier, PLLC

(57) ABSTRACT

There is provided an optical sensor device that, even when the frame is slimmed, can cause the sensor unit to leave or enter the frame smoothly, as well as can accommodate position shifts of the image display panel caused by activation and resulting heat generation thereof. An optical sensor device 1 includes a main body frame 2, a sensor unit 3 including an optical sensor 108, guide members 16 configured to guide the sensor unit 3, and drive means configured to move the sensor unit 3 to a measurement position. The sensor unit 3 is provided with, on both sides thereof, slide members 31. The sensor unit 3 moves obliquely forward along slopes 162 formed on front portions of the guide members 16, and a shading member 9 disposed on the sensor unit 3 contacts a display screen 101*a* of the image display panel. After making a measurement, the sensor unit 3 moves obliquely backward and is stored in the main body frame 2.

5 Claims, 15 Drawing Sheets

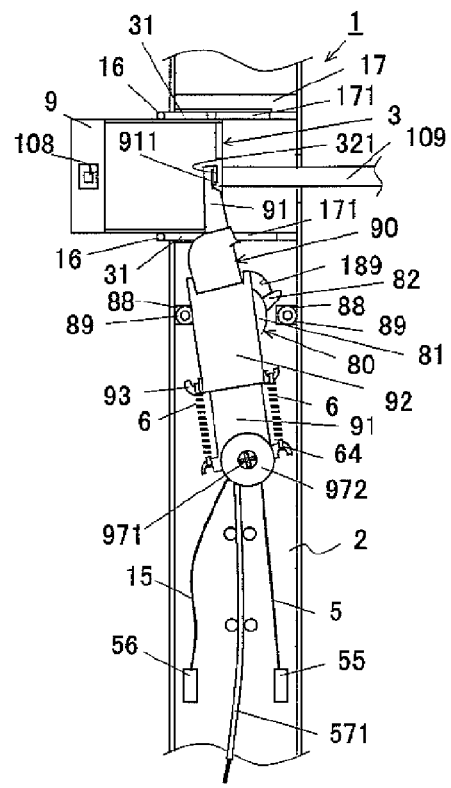 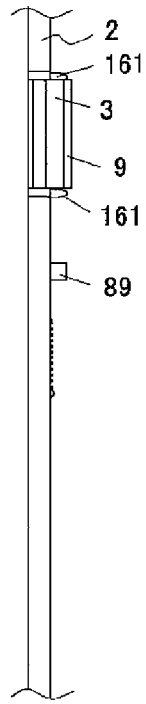 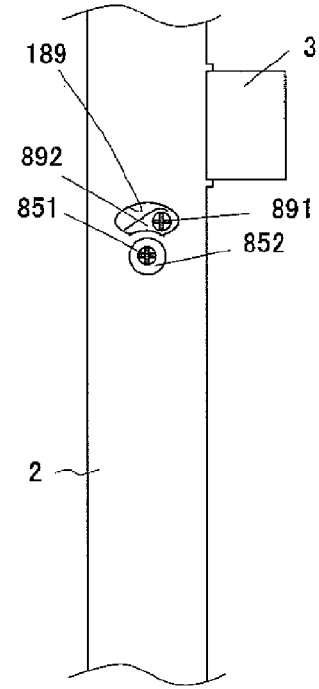
FIG. 3(a)     FIG. 3(b)     FIG. 3(c)
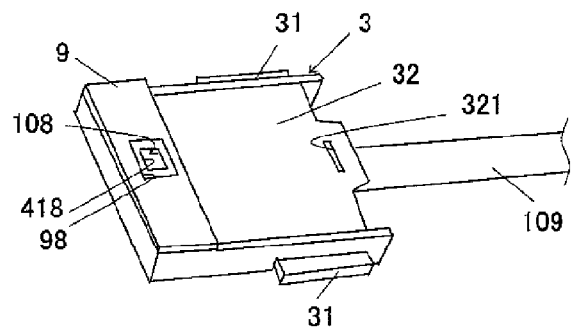
FIG. 4

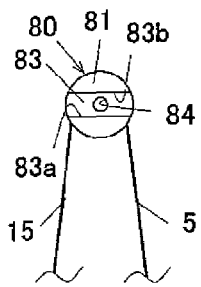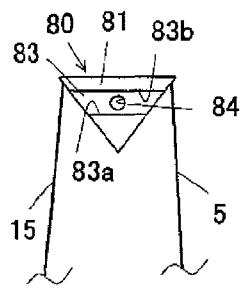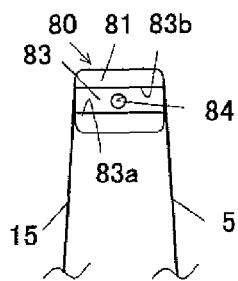
FIG. 23(a)   FIG. 23(b)   FIG. 23(c)
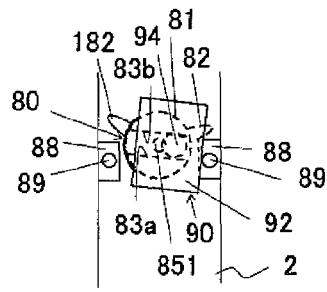
FIG. 24(a)
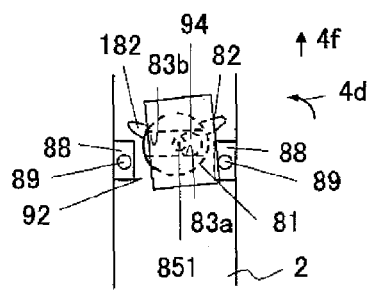
FIG. 24(b)
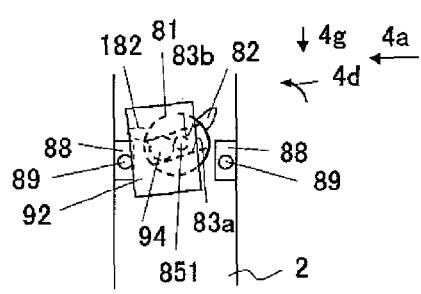
FIG. 24(c)

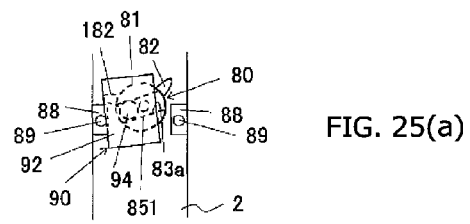
FIG. 25(a)
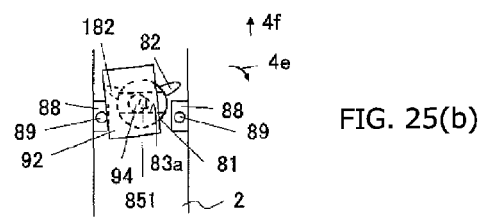
FIG. 25(b)
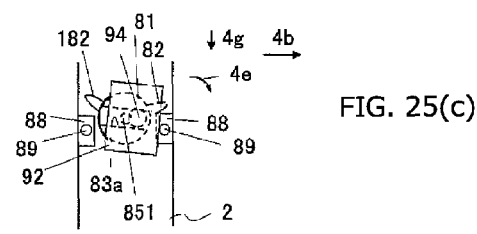
FIG. 25(c)
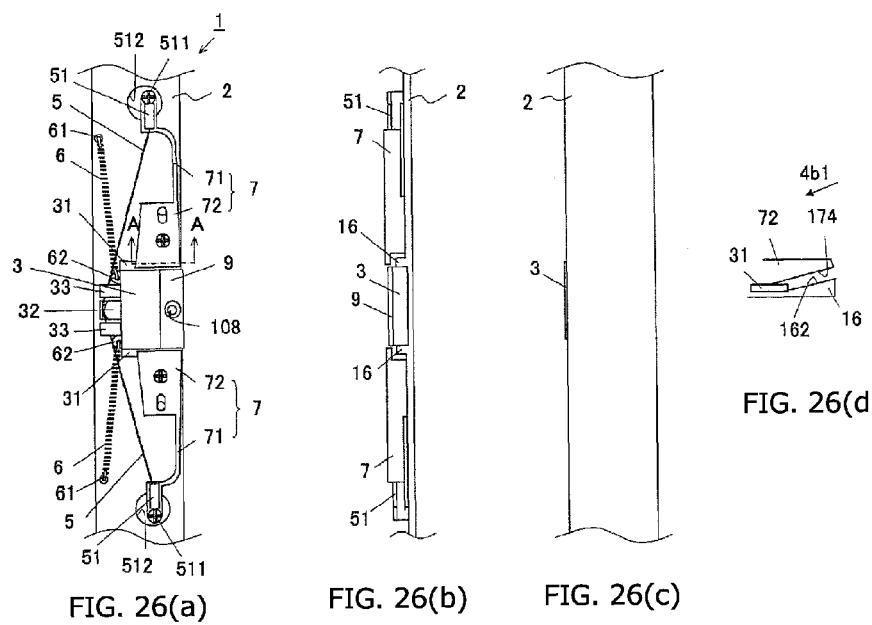
FIG. 26(a)   FIG. 26(b)   FIG. 26(c)
FIG. 26(d)

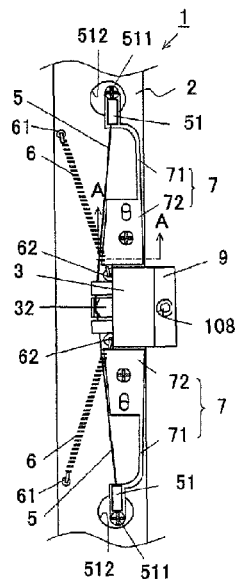 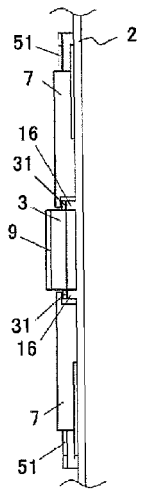 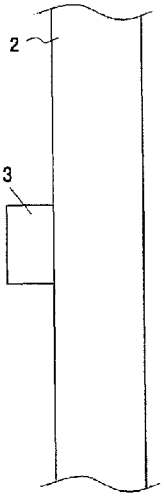 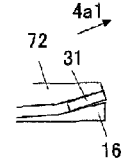
FIG. 27(a)  FIG. 27(b)  FIG. 27(c)  FIG. 27(d)
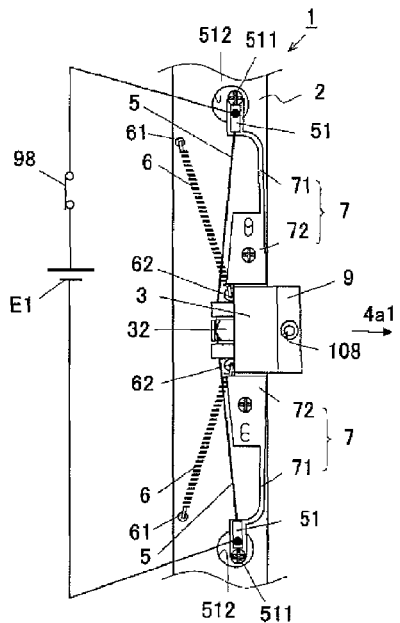
FIG. 28

"PRIOR ART"

"PRIOR ART"

"PRIOR ART"

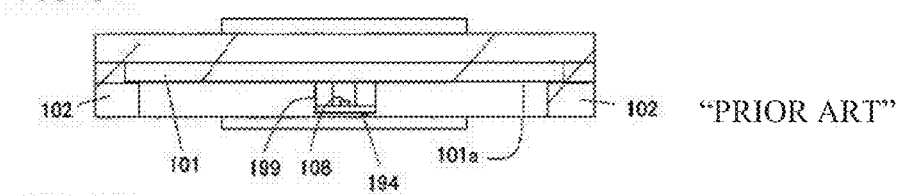
FIG. 34 "PRIOR ART"
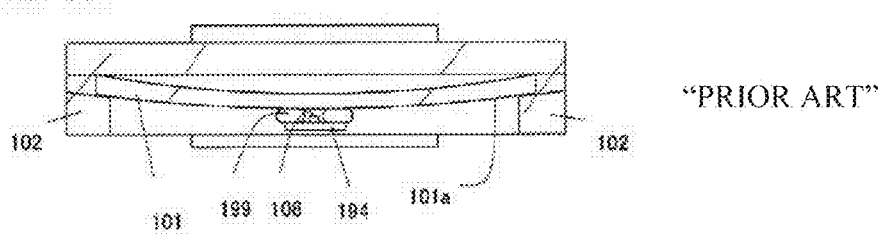
FIG. 35 "PRIOR ART"
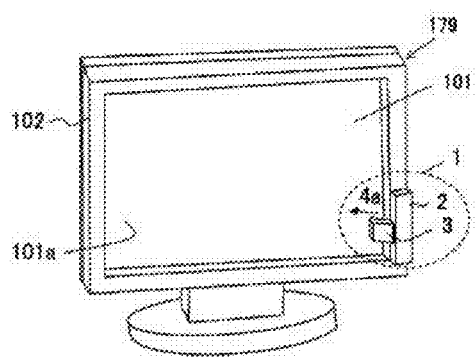
FIG. 36(a)
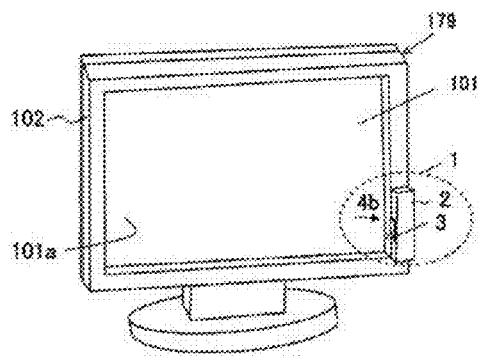
FIG. 36(b)

OPTICAL SENSOR DEVICE AND IMAGE DISPLAY DEVICE

RELATED APPLICATIONS

This application is the U.S. national stage application under 35 U.S.C. §371 of International Patent Application No. PCT/JP2011/077756, filed on Dec. 1, 2011, which claims priority under 35 U.S.C. §119, to Japanese Patent Application No. 2011-132694, filed Jun. 14, 2011, the disclosures of which are incorporated herein by reference in their entireties.

TECHNICAL FIELD

The present invention relates to an optical sensor device including an optical sensor used to measure the luminance, chromaticity, or the like of an image display panel, and an image display device including the optical sensor device.

BACKGROUND ART

Liquid crystal monitors for image display are being used not only in offices or households but also at sites of various kinds of professional work, such as graphic design and medical care. In particular, high-end liquid crystal monitors are being used to display graphic design images or medical diagnostic images, since display of such images requires high-definition image quality having high reproducibility. In recent years, of such liquid crystal monitors, models have become commercially available that enhance the reproducibility of display images by measuring an optical property(s) of the liquid crystal screen, such as luminance, chromaticity, or light quantity, using an optical sensor and then performing calibration on the basis of the measurement data obtained.

A liquid crystal monitor includes a liquid crystal display panel, a bezel surrounding the liquid crystal display panel, a backlight, various types of electronic circuits, and the like. Examples of known documents related to a configuration in which calibration is performed include an optical sensor device of an optical measuring device that includes an optical measuring device main body and a sensor unit including an optical sensor used to measure the luminance, chromaticity, or the like of the monitor screen and that moves the sensor unit out of the optical measuring device main body to the measurement position of the target screen (the monitor screen) to make a measurement, and, after the measurement, stores the sensor unit in the optical measuring device main body (Patent Document 1). The optical sensor device of Patent Document 1 includes an optical measuring device main body 204, a single shaft configured to rotatably support a sensor unit 103, a first follower configured to rotate the shaft, a second follower configured to move the shaft back and forth, and a drive transmission mechanism configured to drive these followers. This optical sensor device is attached to a liquid crystal monitor and used (FIG. 31).

PRIOR ART DOCUMENTS

Patent Documents

Patent Document 1: Japanese Unexamined Patent Application Publication No. 2011-022226

SUMMARY OF THE INVENTION

Problems to be Solved by the Invention

When monitors for displaying graphic design images or medical diagnostic images, or the like perform calibration so as to meet the high-reproducibility, high-definition image quality requirement, it is necessary to accurately measure an optical property(s) of the display screen, such as luminance or chromaticity, using an optical sensor in such a manner that the optical sensor is insusceptible to ambient external light. On the other hand, monitors are strongly required to have functionality, such as the size or viewability of displayed images, and designability. Accordingly, the size of the bezel, such as the width or thickness, is required not to be limited by the shape of the optical sensor unit.

However, in the optical sensor device of Patent Document 1, the sensor unit is rotated so that it leaves or enters the optical measuring device. Accordingly, to obtain a torque required to rotate the arm of the sensor unit, the optical sensor device results in a large-scale mechanism which uses the first follower for rotating the shaft, the second follower for moving the shaft back and forth, and the drive transmission mechanism for driving these followers. Space for housing these followers and the drive transmission mechanism must be obtained. This is a limitation on design. Further, an increase in the size of the optical sensor device for screen measurement affects the designability of the liquid crystal display device.

In view of the foregoing, a method of fixing an optical sensor unit without moving it has been devised as a method for downsizing an optical sensor device. Specifically, a structure as shown in FIGS. 32 to 35 has been proposed and carried out. In this structure, the inner surface of a bezel 102 opposed to a display screen 101a of a liquid crystal display panel is partially recessed; an optical sensor unit 194 is mounted on the recess, for example, by fixing it with a screw 198 in such a manner that a shading member (cushion member) 199 thereof contacts the display screen 101a; and an optical sensor 108 is disposed adjacent to the display screen 101a. FIG. 32 is a front view of the image display panel (monitor) 190 including the traditional optical sensor unit 194, and FIG. 33 is an A-A sectional view thereof.

The liquid crystal display panel 101 is originally thin, prone to be deformed, and delicate. Accordingly, when the display screen 101a is strongly pushed, unevenness on screen would occur, thereby changing luminance, chromaticity, or the like. On the other hand, it is desirable to prevent external noise (external light) from entering the space between the optical sensor 108 and the display screen 101a of the liquid crystal display panel. However, the positional relationship (contact state) between the liquid crystal display panel 101 and the optical sensor unit 194 is affected by initial size variations, which are the sum of component size variations and assembly variations. For this reason, there is employed a structure in which the cushion member 199 is disposed on the surface of the optical sensor unit 194 which will contact the display screen 101a of the liquid crystal display panel (FIG. 33). The cushion member 199 surrounds the optical sensor 108, as well as is hollowed in the center thereof so that the optical sensor 108 can receive light from the display screen 101a of the liquid crystal display panel.

FIGS. 34 and 35 are B-B sectional views showing the disposition of the traditional optical sensor unit 194. FIG. 34 shows a state at a standard temperature; FIG. 35 shows a state when the monitor 190 has operated for a long time and thus generated heat. An investigation carried out by the inventors has revealed that when the monitor 190 was operated for a long time, the liquid crystal display panel 101 generated heat and, as shown in FIG. 35, became deformed into an arch shape in a top view; the center thereof moved forward (in the front direction); the left and right portions thereof moved backward; and the contact position between the liquid crystal display panel 101 and the optical sensor unit 194 shifted according to the temperature. Specifically, when the optical sensor unit 194 is disposed adjacent to the left end (or the right end) of the upper edge of the screen, there occurs a gap between the display screen 101a of the liquid crystal display panel and the cushion member 199 due to variations in temperature, and external noise (external light) enters the gap. This makes it difficult to accurately measure the optical property of the liquid crystal display panel 101, such as luminance or chromaticity. For this reason, it has been believed that the optical sensor unit 194 is preferably disposed in the center of the upper edge of the screen, where a gap does not easily occur due to heat generation of the liquid crystal display panel 101 (FIGS. 34, 35). However, when the optical sensor unit 194 is disposed adjacent to the center of the upper edge of the screen, the liquid crystal display panel 101 pushes the cushion member 199 due to the variations in temperature. For this reason, the cushion member 199 needs to be thickened to relax the pushing force. Further, the optical sensor unit 194 disposed adjacent to the center of the screen even at the upper edge thereof easily comes into sight of the operator. This would limit the flexibility of design. Furthermore, even when the above disposition is used, it is difficult to maintain the light blocking capability of the optical sensor unit 194.

As described above, the positional relationship (the contact state) between the optical sensor unit 194 mounted on the back surface of the bezel 102 (the inner surface of the bezel 102) and the display screen 101a of the liquid crystal display panel is affected by the initial size variations, which are the sum of component size variations and assembly variations, as well as by position shifts of the liquid crystal display panel 101 resulting from heat generated by the liquid crystal display panel 101 itself which cause a gap between the display screen 101a and the cushion member 199 or a reduction in the interval therebetween. Causing the cushion member 199 to offset such position shifts with cushion effects thereof requires setting the thickness of the cushion member 199 to a larger value.

However, as image display devices are slimmed currently, the bezel 102 has been slimmed as well. The interval between the inner surface of the bezel 102 and the liquid crystal display panel 101 has been significantly reduced. For this reason, the cushion member 199 pushed into the bezel 102 is prone to be broken or distorted. The broken or distorted cushion member 199 strongly pushes the display screen 101a of the liquid crystal display panel, resulting in screen unevenness. Further, the broken or distorted cushion member 199 causes a gap between the liquid crystal display panel 101 and the optical sensor unit 194 due to variations in temperature, and external noise (external light) enters the gap. These make it difficult to accurately measure the optical property of the liquid crystal display panel 101, such as luminance or chromaticity. It is not easy to achieve both suppression of the pushing force of the cushion member 199 working on the display screen 101a of the liquid crystal display panel and prevention of occurrence of a gap between the cushion member 199 and the display screen 101a of the liquid crystal display panel. Achieving both requires a complicated adjustment operation, such as independent positioning of the optical sensor unit 194. Even when occurrence of such a gap is prevented initially, repeated position shifts of the liquid crystal display panel 101 caused by activation and resulting heat generation thereof and deactivation and resulting cooling thereof make it difficult for the cushion member 199 to recover from a contracted state thereof, thereby causing a gap as described above. If the cushion member 199 is further contracted, the gap is widened too much, becoming conspicuous and thus disfiguring the liquid crystal display panel 101.

Since the optical sensor device of Patent Document 1 has a structure in which the shaft is rotated and thus moved back and forth, it has difficulty in being downsized. For the configuration in which the optical sensor unit is fixed without moving it, the optical sensor unit is susceptible to position shifts of the image display panel caused by activation and resulting heat generation thereof, as well as remains exposed on part of the image display panel.

Accordingly, an object of the present invention is to provide a novel optical sensor device that, even when the frame is slimmed, can cause the sensor unit to smoothly leave or enter the frame, as well as can accurately measure the optical property of the display screen, such as luminance or chromaticity, using an optical sensor included in the sensor unit in such a manner that the optical sensor is insusceptible to ambient external light.

Means for Solving the Problems

An optical sensor device of the present invention includes: a main body frame disposed in a frame region around an image display panel; an optical sensor used to measure luminance, chromaticity, or the like of the image display panel; a sensor unit including the optical sensor; a guide member configured to guide the sensor unit; and drive means configured to move the sensor unit to a measurement position. The sensor unit is extruded by the drive means, approaches a display screen of the image display panel while being guided by the guide member, makes a measurement, and is subsequently pulled back and stored into the frame by the drive means.

According to the present invention, the sensor unit is extruded by the drive means, approaches the display screen of the image display panel while being guided by the guide member, makes a measurement, and is subsequently pulled back and stored into the frame by the drive means. Accordingly, compared to the structure in which the shaft is rotated to move the sensor unit back and forth, the guide member simply guides the sensor unit and moves it back and forth. As a result, loss due to the displacement of the stroke is reduced, and the sensor unit leaves or enters the frame smoothly.

Examples of the image display panel include liquid crystal display panels, organic electroluminescence display panels, and plasma display panels.

In the optical sensor device of the present invention, the sensor unit may be provided with, on a surface of a front portion thereof, the surface facing the display screen, a shading member which surrounds the optical sensor and allows light from the display screen to be received by the optical sensor. The shading member may be guided by the guide member, contact the display screen of the image display panel, and, after a measurement is made, pulled back away from the display screen by the drive means.

According to the present invention, the shading member is guided by the guide member and contacts the display screen of the image display panel. This makes it easy to make an accurate measurement using the optical sensor in such a manner that the optical sensor is insusceptible to ambient external light. After the measurement, the shading member is pulled back away from the display screen by the drive means. As a result, excessive external force does not work on the image display panel.

In the optical sensor device of the present invention, the guide member may have, on a front portion thereof, a slope extending toward the display screen of the image display panel, and the sensor unit may move forward along the slope and approach the display screen.

According to the present invention, the sensor unit moves forward along the slope formed on the front portion of the guide member and approaches the display screen. Thus, the sensor unit moves back and forth in an accurate position with high reproducibility. As used herein, "the forward" refers to a direction extending toward the display screen of the image display panel. Examples thereof include a configuration in which the sensor unit is obliquely extruded and a configuration in which the sensor unit is extruded in parallel.

In the optical sensor device of the present invention, a slide member configured to slide along the guide member may be disposed on both sides of the sensor unit, and an elastic body opposed to the guide member and configured to push the slide member toward the guide member may be disposed along both sides of the sensor unit.

According to the present invention, the slide member configured to slide along the guide member is disposed on both sides of the sensor unit. This makes it easy to cause the sensor unit to slide with good lateral balance. Further, the elastic body opposed to the guide member and configured to push the slide members toward the guide member is disposed along both sides of the sensor unit. This eliminates the possibility that the sensor unit may go off the slide course. Examples of the slide members include slide plates, slide pins, and slide rollers.

As used herein, the elastic body refers to an elastic material which is used as a spring owing to resilience thereof. Examples thereof include metals, ceramic, plastics, elastomers, rubber, and fluid. Examples of the spring include flat springs, coil springs, torsion springs, spiral springs, disc springs, wire springs, rubber springs, hydraulic springs, and composite springs.

In the optical sensor device of the present invention, the elastic body may be a flat spring. When the sensor unit moves obliquely forward and approaches the display screen, a front end of the flat spring may push a rear portion of the slide member.

According to the present invention, since the elastic body is a flat spring, it is easy to slim the elastic body and to obtain stable pushing force. Since the front end of the flat spring pushes the rear portion of the slide member when the sensor unit moves obliquely forward and approaches the display screen, the pushing force on the display screen falls within a predetermined range due to the effect of the flat spring. It is also possible to accommodate position shifts of the image display panel caused by activation and resulting heat generation thereof.

Examples of the drive means include actuators which convert electric energy into mechanical power to drive a load. More specific examples include motors, solenoids, actuators that use a piezoelectric element or electrostriction element, and actuators that use a shape-memory alloy.

In the optical sensor device of the present invention, the sensor unit and the guide member may be disposed in an x direction, and a return spring configured to contract or expand in a y direction and an actuator configured to contract or expand in a y direction may be included. Either by energizing the actuator to contract against resilience of the return spring or by energizing the actuator to contract and thus causing the return spring to operate, the sensor unit moves out of the frame to a measurement position in the x direction.

According to the present invention, by using force generated when the actuator contracts in the y direction, the sensor unit moves forward in the x direction. Thus, the loss of stroke displacement is reduced, and the sensor unit leaves or enters the frame smoothly. In the present specification, the relationship between the X direction and the Y direction is a relationship where if the X direction is a horizontal direction when the frame is seen from the front side, the Y direction is a vertical direction or a relationship where if the X direction is a vertical direction when the frame is seen from the front side, the Y direction is a horizontal direction. As used herein, the x direction is defined as a direction whose angle is in a range of 45° to 135° or −45° to −135° when the y direction is, for example, a horizontal direction and has an angle of 0°. Alternatively, the x direction is defined as a direction whose angle is in a range of −45° to 45° or −135° to −225° when the y direction is, for example, a vertical direction and has an angle of 90°.

Examples of the return spring include extension springs and pressing springs, and examples of the shape thereof include coil shapes, spiral shapes, and string shapes. The return spring is preferably a coiled extension spring. Use of a coiled extension spring allows a long stroke of resilience to be set. This makes it easy to increase the stroke of movement of the sensor unit.

The actuator refers to an actuator that, when energized, contracts against the resilience of the spring member. Examples of the actuator include shape-memory alloy actuators, electrostriction actuators, and examples of the shape thereof include wire shapes, planar shapes, coil shapes, spiral shapes, cylindrical shapes, and prismatic shapes. Planar and wire actuators can be disposed with a high degree of freedom even in a thin, narrow place. For the energization, direct current or alternating current is selected as appropriate, depending on the characteristics of the actuator to be energized, and passed through the actuator.

The actuator used as the drive means of the present invention is preferably a shape-memory alloy wire which contracts when energized and thus generates heat. Use of a shape-memory alloy wire makes it easy to increase the amount of displacement due to energization.

Examples of the material for the shape-memory alloy wire include titanium-nickel alloys and iron-manganese-silicon alloys. Examples of the shape of the shape-memory alloy wire include solid wires, stranded wires, and coil or spring wires. A shape-memory alloy wire having a larger diameter can generate a greater contraction force but requires larger energizing current and is less responsive when cooled. In contrast, a shape-memory alloy wire having a smaller diameter generates a smaller contraction force but requires smaller energizing current and is more responsive. The diameter of the shape-memory alloy wire is set in a range of, for example, 0.05 to 0.5 mm. The temperature around the monitor screen of the operating image display device may increase from room temperature up to around 50° C. Accordingly, to prevent the shape-memory alloy wire from malfunctioning due to the temperature, it is necessary to select a shape-memory alloy wire which, when energized, generates Joule heat having a temperature sufficiently higher than that around the monitor screen. More specifically, it is necessary to select shape-memory alloy which, when energized, operates at a temperature of 60° C. or more. A shape-memory alloy which contracts at a temperature of about 70° C. and expands at a temperature of about 60° C. is practical. According to the operation principle, by setting the operation temperature at which the shape-memory alloy wire contracts or expands to a higher temperature, it is possible to stably operate the shape-memory alloy wire with higher reproducibility.

The drive means of the present invention is not limited to the shape-memory alloy wire and may be a motor, solenoid, or the like. For example, by combining a wire, a pulley, and a motor (or solenoid) together, the wire is wound around the pulley so that the wire is apparently contracted, or the wire is pulled out from the pulley so that the wire is apparently expanded. In this way, the combination can operate similarly with the shape-memory alloy wire.

In the optical sensor device of the present invention, a flexible balance member having a base coupled to the frame may be included. An end of the actuator may be fixed to the balance member. When an external force to push back the sensor unit from the measurement position to inside the frame in the x direction is applied to the sensor unit, the balance member may be bent to relax the external force. According to the present invention, when an external force to push back the sensor unit into the frame is applied to the sensor unit located at the measurement position, the balance member is bent, relaxing the external force. This makes it difficult for a load (external force) to be directly imposed on the actuator, providing an optical sensor device having high operation reliability.

In the optical sensor device of the present invention, for example, a pair of arcuate members each having a base coupled to the frame may be disposed in the Y direction as the balance members, and an end of the shape-memory alloy wire may be fixed to an end of each arcuate member. In this configuration, for the sensor to make a measurement, the shape-memory alloy wire is energized to linearly move the sensor unit to a measurement position; the energization is continued during the measurement by the sensor; and after the measurement, the shape-memory alloy wire is de-energized to return the sensor unit to its original position. In this configuration, an end of the shape-memory alloy wire is fixed to an end of each arcuate member, and these arcuate members are bent to relax the external force. Accordingly, no link mechanism or crank mechanism is included, allowing an optical sensor device to be formed using a minimum number of components. According to the present invention, only de-energizing the shape-memory alloy wire after the measurement allows the resilience of the spring member to be exerted. Thus, the sensor unit is returned to its original position.

In the optical sensor device of the present invention, a rotatable balance member having a shaft coupled to the frame may be included. An end of the actuator may be fixed to the balance member. When an external force to push back the sensor unit from the measurement position to inside the frame in the x direction is applied to the sensor unit, the balance member may be rotated to relax the external force. According to the present invention, when an external force to push back the sensor unit into the frame is applied to the sensor unit located at the measurement position, the balance member is rotated, relaxing the external force. This makes it difficult for a load (external force) to be directly imposed on the actuator, providing an optical sensor device having high operation reliability.

In the optical sensor device of the present invention, for example, a rotational member having a shaft coupled to the frame may be disposed as the balance member; an end of the actuator (shape-memory alloy wire) may be fixed to an end of the rotational member; and the rotational member may be rotated when pulled. In this configuration, for the sensor to make a measurement, energization is performed to cause the rotational member to rotate, thus the sensor unit is moved to the measurement position, and the energization is stopped during the measurement by the sensor.

In the optical sensor device of the present invention, there may be included a movable arm having a tip that stops in the sensor unit in an engaged state, the movable arm being rotatable using a base thereof as a rotational axis. A slider capable of sliding in the y direction may be disposed in a main body of the movable arm. A shaft of the balance member (rotational member) may be coupled to the frame. An end of the spring member may stop at a base of the main body of the movable arm in an engaged state to pull back the slider, and the other end thereof may stop at the slider in an engaged state. An end of the actuator may be fixed to the balance member to cause the balance member to start rotating forward, and the other end thereof may be coupled to the frame. The movable arm and the balance member may interlock with each other. The actuator may be energized to contract against the resilience of the return spring, thereby causing the balance member to start rotating forward, and the slider may be subsequently pulled back using the resilience of the return spring to cause the balance member to further rotate forward, and the balance member and the movable arm may interlock with each other to move the sensor unit from inside the frame to the measurement position in the x direction.

This mechanism employs a system where the actuator (shape-memory alloy wire) does not directly drive the sensor unit. Until the actuator contracts to some extent, the sensor unit does not start moving, as described above. Accordingly, the sensor unit is insusceptible to heat dissipation from the image display panel, and the possibility that the sensor unit may malfunction due to heat is extremely low. The balance member and the movable arm interlock with each other, for example, in the following configurations: a slide pin formed on the slider is placed on a sidewall of the balance member; the slide pin is placed on a sidewall using a step formed on the balance member; and the slide pin is inserted into a long groove formed in the balance member.

In the optical sensor device of the present invention, the actuator may be defined as a first actuator, and a second actuator disposed in the y direction and having an end fixed to the balance member (rotational member) may be disposed. When energized, the second actuator may contract to cause the balance member to start rotating backward. The sensor unit may be linearly moved from inside the frame to the measurement position in the x direction by energizing the first actuator without energizing the second actuator, and after the sensor makes a measurement, the sensor unit may be returned from the measurement position to the original position by energizing the second actuator without energizing the first actuator. According to this configuration, by energizing the first actuator, the sensor unit can be slid to the measurement position; conversely, by energizing the second actuator, the sensor unit can be slid back to its original position. Further, these actuators are energized only when moving the sensor unit. During the other periods of time, that is, while the sensor unit is held at the measurement position or while the sensor unit is stored in the frame, these actuators are de-energized. Accordingly, there is provided an optical sensor device which is energy-saving and has high operation reliability.

The above configuration of the present invention will be described in more detail. For example, a movable arm may be previously mounted on the sensor unit; a rotational plate having a laterally long groove may be provided as the balance member (rotational member); and the movable arm may be provided with a slider having a link pin which can be inserted into the laterally long groove; and by combining these components, a link structure may be formed. Thus, these components may be coupled together in such a manner that an operation of each component is transmitted to the others with a short delay. Specifically, the movable arm and the rotational member may be coupled together in such a manner that an operation of the movable arm causes an operation of the rotational member with a delay, and an operation of the rotational member causes an operation of the movable arm with a delay. For example, when the first shape-memory alloy wire contracts, the combination of the pair of shape-memory alloy wires, the movable arm, and the rotational member, and the sensor unit may move the sensor unit leftward; when the second shape-memory alloy wire contracts, that combination may move back the sensor unit rightward. Examples of the shape of the balance member (rotational member) include various shapes, such as a disc, a triangular plate, and a rectangular plate. Note that the left and right directions (lateral direction) represent relative directions and that the position relationship between the main body frame and the sensor unit in the frame region around the image display panel may be any of the vertical direction, the lateral direction, and the diagonally upper direction or diagonally lower direction.

Effect of the Invention

According to the present invention, the sensor unit is extruded by the drive means, approaches the display screen of the image display panel while being guided by the guide member, makes a measurement, and is subsequently pulled back and stored into the frame by the drive means. Since the guide member simply guides the sensor unit and moves it back and forth, loss due to the displacement of the stroke is reduced, and the sensor unit leaves or enters the frame smoothly.

According to the present invention, the shading member is guided by the guide member and contacts the display screen of the image display panel. This makes it easy to make an accurate measurement using the optical sensor in such a manner that the optical sensor is insusceptible to ambient external light. After the measurement, the shading member is pulled back away from the display screen by the drive means. As a result, excessive external force does not work on the image display panel.

According to the present invention, the sensor unit moves obliquely forward along the slope formed on the front portion of the guide member and approaches the display screen. Thus, the sensor unit moves back and forth in an accurate position with high reproducibility.

According to the present invention, the slide member configured to slide along the guide member is disposed on both sides of the sensor unit. This makes it easy to cause the sensor unit to slide with good lateral balance. Further, the elastic body opposed to the guide member and configured to push the slide member toward the guide member is disposed along both sides of the sensor unit. This eliminates the possibility that the sensor unit may go off the slide course. According to the present invention, since the elastic body is a flat spring, it is easy to thin the elastic body and to obtain stable pushing force. Since the front end of the flat spring pushes the rear portion of the slide member when the sensor unit moves obliquely forward and approaches the display screen, the pushing force on the display screen falls within a predetermined range due to the effect of the flat springs. Further, it is possible to accommodate position shifts of the image display panel caused by activation and resulting heat generation thereof. According to the present invention, there is provided a novel optical sensor device that, even when the frame is slimmed, can cause the sensor unit to leave or enter the frame smoothly, as well as can accurately measure the optical property of the display screen, such as luminance or chromaticity, using an optical sensor in such a manner that the optical sensor is insusceptible to ambient external light.

BRIEF DESCRIPTION OF THE DRAWINGS

FIG. 1 includes perspective views illustrating an image display device including an optical sensor device of an embodiment of the present invention, in which

FIG. 2 includes diagrams showing a state in which a sensor unit is stored in structural drawings illustrating an optical sensor device of a first embodiment of the present invention, in which

FIG. 3 includes diagrams showing a state in which the sensor unit is extruded over the screen in structural drawings illustrating the optical sensor device of the first embodiment of the present invention, in which FIG. 3(a) is a rear view seen from inside; FIG. 3(b) is a side view; and FIG. 3(c) is a front view seen from outside.

FIG. 4 is a perspective view showing the sensor unit of the first embodiment.

FIG. 7 includes sectional views schematically showing the relationship between the sensor unit and the display screen of the image display panel according to the first embodiment, in which

FIG. 17 are sectional views showing the relationship between the sensor unit and the main body frame in another example of the optical sensor device of the first embodiment, in which

FIG. 19 includes structural diagrams illustrating a movable arm disposed in the optical sensor device of the first embodiment of the present invention, in which

FIG. 20 includes structural diagrams illustrating a rotational member disposed in the optical sensor device of the first embodiment of the present invention, in which

FIG. 21 includes structural diagrams illustrating the disposition of the rotational member and the first and second shape-memory alloy wires according to the first embodiment, in which

FIG. 22 includes structural diagrams illustrating another example of the disposition of the rotational member and the first and second shape-memory alloy wires according to the first embodiment, in which

FIG. 23 includes structural diagrams illustrating other examples of the disposition of the rotational member and the first and second shape-memory alloy wires according to the first embodiment, in which FIG. 23(a) shows an example of a disc; FIG. 23(b) shows an example of a triangular plate; and FIG. 23(c) shows an example of a rectangular plate.

FIG. 24 includes structural diagrams illustrating the interlocking relationship between the rotational member and a slider of the movable arm according to the first embodiment of the present invention, in which FIG. 24(a) shows the relationship when the sensor unit is stored; FIG. 24(b) shows the relationship when the first shape-memory alloy wire is being energized; and FIG. 24(c) shows the relationship when the first shape-memory alloy wire has been de-energized.

FIG. 25 includes structural diagrams illustrating the interlocking relationship between the rotational member and the slider of the movable arm according to the first embodiment of the present invention, in which FIG. 25(a) shows the relationship when the sensor unit is extruded over the screen; FIG. 25(b) shows the relationship when the second shape-memory alloy wire is being energized; and FIG. 25(c) shows the relationship when the second shape-memory alloy wire has been de-energized.

FIG. 26 includes diagrams showing a state in which a sensor unit is stored in structural drawings illustrating an optical sensor device according to a second embodiment of the present invention, in which FIG. 26(a) is a rear view seen from inside; FIG. 26(b) is a side view; FIG. 26(c) is a front view seen from outside; and FIG. 26(d) is a sectional view schematically showing an A-A section.

FIG. 27 includes diagrams showing a state in which the sensor unit is extruded over the screen in structural drawings illustrating the optical sensor device according to the second embodiment of the present invention, in which FIG. 27(a) is a rear view seen from inside; FIG. 27(b) is a side view; FIG. 27(c) is a front view seen from outside; and FIG. 27(d) is a sectional view schematically showing an A-A section.

FIG. 28 is a diagram showing a state where a shape-memory alloy wire of the second embodiment is energized and the sensor unit is extruded over the screen.

FIG. 34 is a B-B sectional view showing the disposition of the traditional optical sensor unit and shows a state when the temperature is standard.

FIG. 35 is a B-B sectional view showing the disposition of the traditional optical sensor unit and shows a state when heat is generated.

FIG. 36 includes perspective views illustrating a configuration where an optical sensor device of an embodiment of the present invention is attached to a known image display device, in which FIG. 36(a) shows a state where a sensor unit is extruded over the screen; and FIG. 36(b) shows a state where the sensor unit is stored.

EMBODIMENTS

Now, embodiments of the present invention will be described with reference to the drawings.

Embodiments of Present Invention

Figures 1A, 1B:
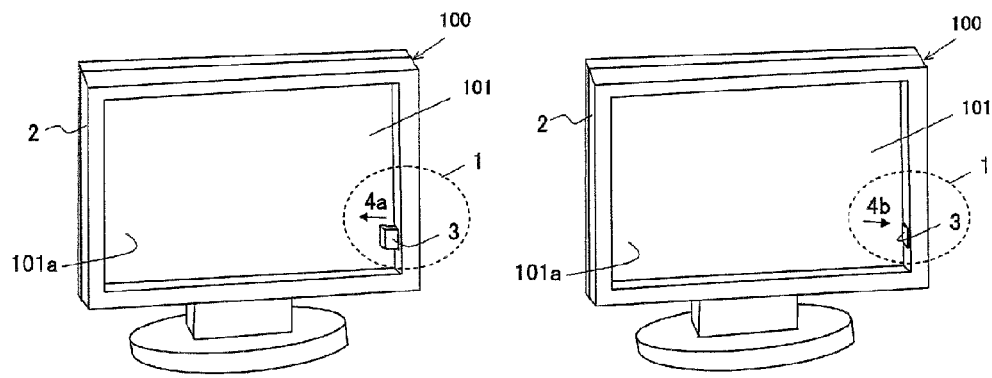
FIG. 1(a) shows a state where a sensor unit is extruded over the screen.
FIG. 1(b) shows a state where the sensor unit is stored.

FIG. 1 includes perspective views illustrating a liquid crystal display device 100 including an optical sensor device 1 of an embodiment of the present invention. The optical sensor device 1 of the present embodiment is integrated into a bezel (frame) 2 around a monitor screen (liquid crystal display panel) 101 of the liquid crystal display device (liquid crystal monitor) 100. A sensor unit 3 is a small, planar (stick-shaped) unit configured to measure luminance, chromaticity, or the like on a display screen 101a of the liquid crystal display panel. To calibrate the liquid crystal display panel 101 at each predetermined time, the optical sensor device 1 of the present embodiment extrudes the sensor unit 3 from the bezel 2 in the direction of reference numeral 4a and then moves it to a measurement position on the liquid crystal display panel 101 so as to make a measurement (FIG. 1(a)); and returns the sensor unit 3 in the direction of reference numeral 4b and stores it in the bezel 2 after the measurement (FIG. 1(b)). As used herein, the direction of reference numeral 4a refers to a forward direction in which the sensor unit 3 moves forward and approaches and contacts the display screen 101a of the liquid crystal display panel; the direction of reference numeral 4b refers to a backward direction in which the sensor unit 3 moves backward away from the display screen 101a of the liquid crystal display panel. In an example shown in FIG. 1, the optical sensor unit 3 is disposed on the lower-right portion of the landscape liquid crystal display panel 101; however, it may be mounted on any position around the liquid crystal display panel 101 as long as the position falls within the frame region of the liquid crystal display panel 101. Alternatively, as shown in FIG. 36, the optical sensor device 1 of the present invention may be attached to an existing image display device 179. In an example shown in FIG. 36, a sensor unit 3 is extruded from a main body frame 2 on a bezel 102 in the direction of reference numeral 4a and moved to a measurement position on a liquid crystal display panel 101 so as to make a measurement (FIG. 36(a)); and is returned in the direction of reference numeral 4b and stored in the main body frame 2 after the measurement (FIG. 36(b)).

First Embodiment

Figures 2A, 2B, 2C:
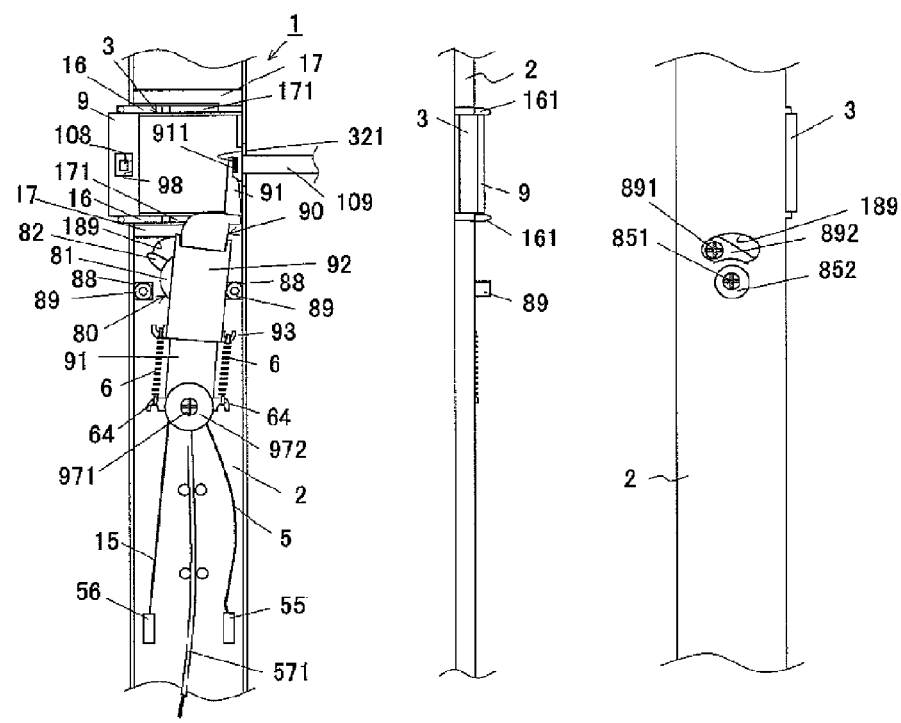
FIG. 2(a) is a rear view seen from inside.
FIG. 2(b) is a side view.
FIG. 2(c) is a front view seen from outside.

FIGS. 2 and 3 include structure diagrams illustrating an optical sensor device 1 of a first embodiment of the present invention. FIG. 2 shows a state in which a sensor unit is stored; FIG. 3 shows a state in which the sensor unit is extruded over the screen. FIGS. 2(a) and 3(a) are rear views seen from inside, FIGS. 2(b) and 3(b) are side views, and FIGS. 2(c) and 3(c) are front views seen from outside. As used herein, the rear view seen from inside refers to a diagram when viewing the user from the display screen 101a of the liquid crystal display panel; the front view seen from outside is a diagram when viewing the display screen 101a of the liquid crystal display panel from the user. For the sake of description, the horizontal direction in the rear view is defined as an x direction, and the vertical direction therein as a y direction.

Figure 5:
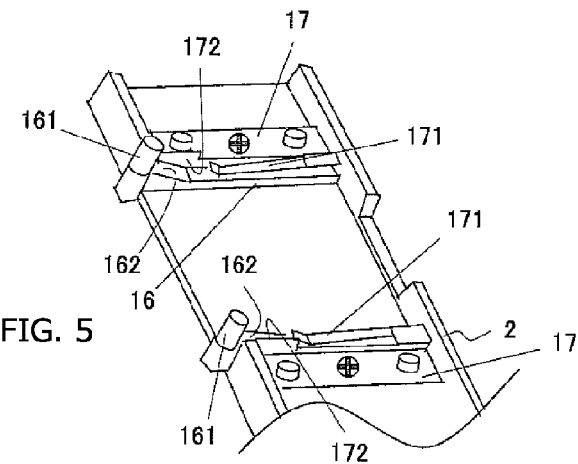
FIG. 5 is a perspective view showing a portion in which the sensor unit is mounted on a main body frame according to the first embodiment.

For the optical sensor device 1 of the present embodiment, the rectangular, planar sensor unit 3 is disposed in the bezel 2. Guide members 16 configured to guide the sensor unit 3 are formed on both sides of the sensor unit 3 (on the upper and lower sides thereof in FIGS. 2(a) and 3(a)) as integrated with the main body frame 2 (see FIG. 5). The guide members 16 have a guide rail function. Each guide member 16 has, on a front part thereof (on the side of the main body frame 2 from which the sensor unit 3 is extruded), a slope 162 extending toward the display screen 101a of the image display panel. Each guide member 16 is also provided with, at the front end thereof (on the surface of the main body frame 2 from which the sensor unit 3 is extruded), a pin-shaped stopper 161 integrated with the main body frame 2 (FIG. 5). In this configuration, when the front surfaces of slide members (projecting members) 31 disposed on both sides of the sensor unit 3 contact the stoppers 161 disposed on the main body frame 2, the extruded sensor unit 3 stops at a predetermined position. The present embodiment is not limited to this example configuration. For example, the stoppers may be disposed over the liquid crystal display panel 101 in such a manner that the front surfaces of the slide members 31 of the sensor unit 3 contact the stoppers. Alternatively, for example, stoppers separate from the guide members 16 may be attached to predetermined positions of the bezel 2.

Figure 6:
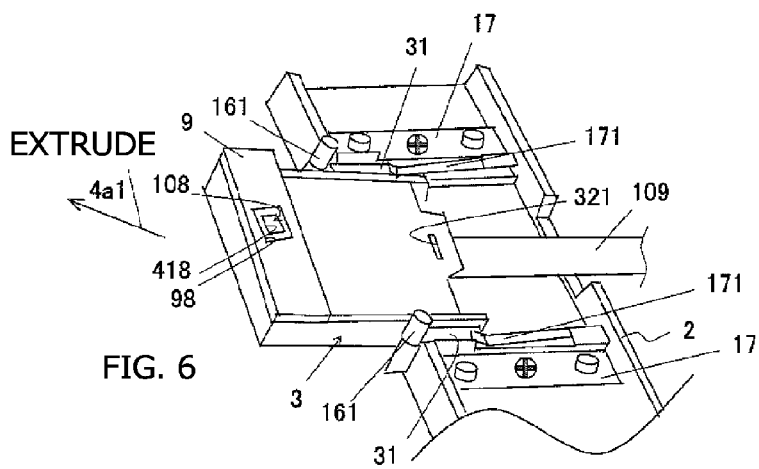
FIG. 6 is a perspective view showing the relationship between the extruded sensor unit and the main body frame according to the first embodiment.
Figure 13:
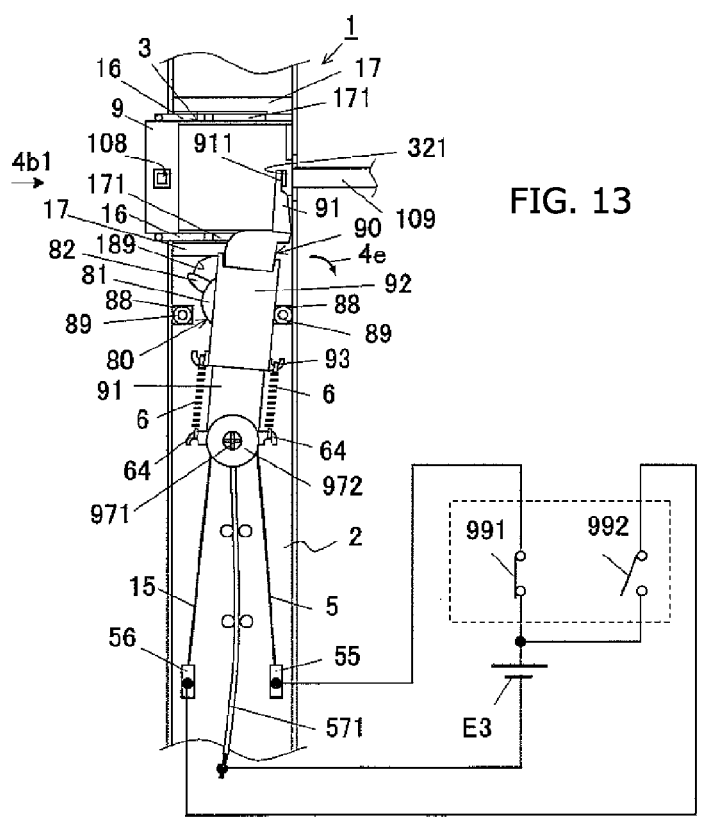
FIG. 13 is a diagram showing a state where the second shape-memory alloy wire of the shape-memory alloy wires of the first embodiment is immediately before de-energized.

The planar slide members (projecting members) 31 configured to slide along the guide surfaces (including the slopes 162) of the guide members 16 are disposed on both sides of the sensor unit 3 (FIG. 4). Flat springs (elastic bodies) 171 opposed to the guide members 16 and configured to push the slide members 31 toward the guide members 16 are mounted on the main body frame 2 along both sides of the sensor unit 3 (FIG. 5). Each flat spring 171 and a corresponding prevention wall 172 configured to prevent side-to-side runout of the sensor unit 3 are integrally molded by pressing a metal plate and fixed by a screw. An optical sensor 108 is mounted on a substrate (not shown) and incorporated into the sensor unit 3 (see FIG. 7) and is used to measure the luminance, chromaticity, or the like of the liquid crystal display panel 101. The sensor unit 3 is coupled to a control substrate (not shown) of the main body of the liquid crystal display device 100 through a flexible flat cable (FFC) 109 drawn from the rear surface of the sensor unit 3. When software installed on a personal computer is started, the sensor unit 3 measures an optical property(s) of the liquid crystal display panel 101, such as luminance, chromaticity, or light quantity, using the optical sensor 108. Based on the measurement data obtained, calibration is performed. That is, according to the present embodiment, the sensor unit 3 is extruded and moved obliquely forward (reference numeral 4a1), approaches and contacts the display screen 101a of the liquid crystal display panel (FIGS. 6 and 10), and measures the optical property of the liquid crystal display panel 101, such as luminance, chromaticity, or light quantity, using the optical sensor 108 with external light blocked by a shading member 9. After the measurement, the sensor unit 3 is moved obliquely backward (reference numeral 4b1) away from the display screen 101a of the liquid crystal display panel and stored (FIG. 13).

In the present embodiment, the light receiving part of the optical sensor 108 is previously provided with an infrared ray (IR) filter so as to prevent entry of external light into the optical sensor 108. The surface adjacent to the display screen 101a, of the sensor unit 3 has a rectangular window hole 418 for light reception. In the present embodiment, the planar shading member (cushion member) 9 is firmly affixed to the surface adjacent to the display screen 101a, of the sensor unit 3 using a double-sided tape, adhesive, or the like (FIG. 4). While the rectangular shading member 9 surrounds the optical sensor 108, it has a rectangular window 98 formed by hollowing the center thereof. Through the rectangular window 98, light from the display screen 101a is received by the optical sensor 108. The window 98 may be circular. Examples of the shading member 9 include paper, resin sheets, flock paper, flock sheets, felt, sponge, rubber, and elastomers. Flock paper or flock sheet is particularly preferable as the shading member 9 of the present embodiment. The reason is that flock paper or flock sheet has high absorbance and cushioning characteristics, as well as slidability and therefore can reduce the load on the image display panel 101 and block light effectively.

The sensor unit 3 also has a rectangular groove (recess) 321 in the back surface thereof (the surface in which the optical sensor 108 is disposed). A nail 911 at the front end of a main body 91 of a movable arm 90 locks in the recess 321. The sensor unit 3 is extruded by drive means (to be detailed later) and approaches the display screen 101a of the image display panel while being guided by the guide members 16; and, after the measurement, is pulled back and stored in the main body frame 2 by the drive means (FIG. 2(a)).

Figures 7A, 7B, 7C:
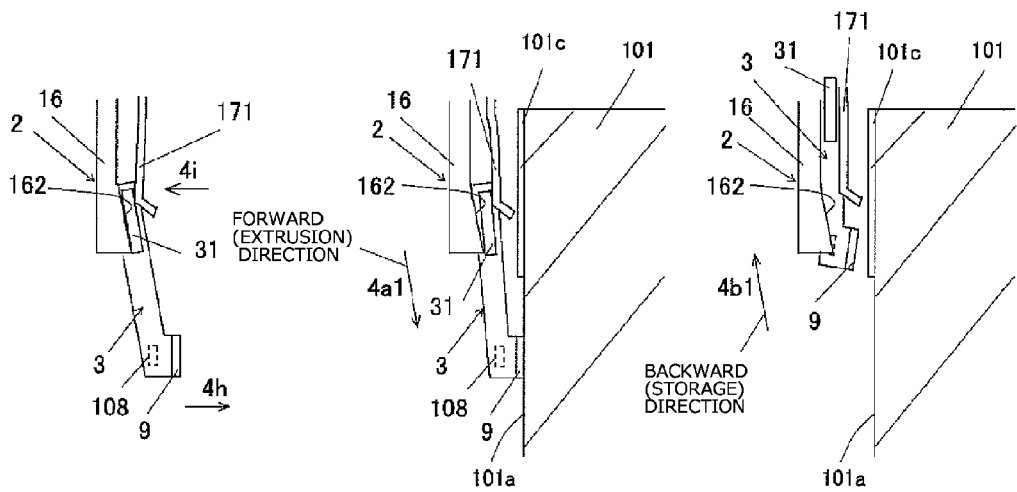
FIG. 7(a) shows a state in which the sensor unit is extruded, assuming that the image display panel is not present.
FIG. 7(b) shows a state in which the sensor unit is extruded, assuming that the image display panel is present.
FIG. 7(c) shows a state in which the sensor unit is stored, assuming that the image display panel is present.

FIG. 7 includes sectional views schematically showing the relationship between the sensor unit 3 and the display screen 101a of the image display panel according to the first embodiment. To clarify the description, FIG. 7(a) shows a state in which the sensor unit 3 is extruded, assuming that the image display panel 101 is not present; FIG. 7(b) shows a state in which the sensor unit 3 is extruded, assuming that the image display panel 101 is present; and FIG. 7(c) shows a state in which the sensor unit 3 is stored, assuming that the image display panel 101 is present.

In the present embodiment, each guide member 16 has, on the front part thereof, the slope 162 extending toward the display screen 101a of the image display panel. The sensor unit 3 moves obliquely forward along the slope 162 (moves forward in the direction of reference numeral 4a1) and approaches the display screen 101a. At this time, the front ends of the flat springs 171 hold the rear portions of the slide members 31 disposed on the sensor unit 3. Specifically, when the flat springs 171 push the rear portions of the slide members 31 in the direction of reference numeral 4i, the shading member 9 is extruded in the direction of reference numeral 4h (FIG. 7(a)), contacts the display screen 101a with predetermined pressing force, and thus can closely contact the display screen 101a (FIG. 7(b)). The sensor unit 3 obtains high light blocking effects and, due to stable pushing force exerted by the flat springs 171, exerts pushing force within a predetermined range on the display screen 101a, as well as can accommodate position shifts of the image display panel 101 caused by activation and resulting heat generation thereof. The sensor unit 3 can also accommodate variations in the depth dimension depending on, for example, the type of the image display panel 101 including the optical sensor device 1 or variations in the incorporation of the image display panel 101 into the image display device. After the optical sensor 108 makes measurements, the sensor unit 3 moves obliquely backward along the slopes 162 (moves backward in the direction of reference numeral 4b1) away from the display screen 101a and is stored in the main body frame 2 (FIG. 7(c)).

Figure 15:
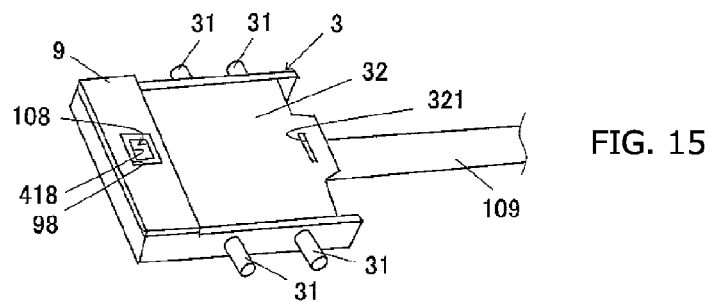
FIG. 15 is a perspective view showing a sensor unit in another example of the optical sensor device of the first embodiment.
Figure 16:
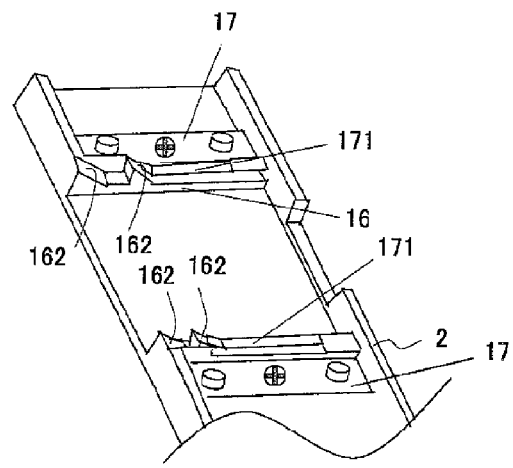
FIG. 16 is a perspective view showing a portion in which the sensor unit is mounted on the main body frame in another example of the optical sensor device of the first embodiment.
Figure 17A:
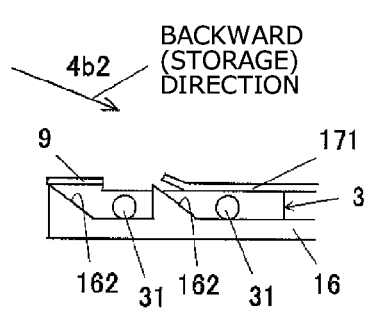
FIG. 17(a) shows a state in which the sensor unit 3 is stored.
Figure 17B:
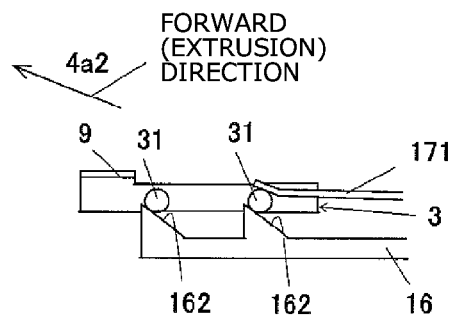
FIG. 17(b) shows a state in which the sensor unit 3 is extruded.

FIG. 17 includes sectional views schematically showing the relationship between the sensor unit 3 and the main body frame 2 in another example of the optical sensor device 1 of the first embodiment, in which FIG. 17(a) shows a state in which the sensor unit 3 is stored; and FIG. 17(b) shows a state in which the sensor unit 3 is extruded. In the present embodiment, the sensor unit 3 is provided with, on each side thereof, two pin-shaped slide members (slide pins) 31 disposed at a predetermined interval and configured to slide along the guide surface (including the slopes 162) of the corresponding guide member 16 (FIG. 15). The two guide members 16 disposed on the main body frame 2 have a guide rail function. Each guide member 16 has, on a front part thereof (on the part of the main body frame 2 from which the sensor unit 3 of is extruded), two slopes 162 formed at a predetermined interval and extending toward the display screen 101a of the image display panel (FIG. 16). The interval between the slide pins 31 of the sensor unit corresponds to the interval between the slopes 162 of the guide member. According to the present embodiment, the sensor unit 3 moves back and forth stably while being kept parallel with the main body frame 2. That is, according to the present embodiment, the sensor unit 3 is extruded and moved forward in parallel with the main body frame 2 (reference numeral 4a2), approaches and contacts the display screen 101a of the liquid crystal display panel (FIG. 17(b)), and measures an optical property of the liquid crystal display panel 101, such as luminance, chromaticity, or light quantity, using the optical sensor 108 with external light blocked by the shading member 9. After the measurement, the sensor unit 3 moves backward in parallel with the main body frame 2 (reference numeral 4b2) away from the display screen 101a of the liquid crystal display panel and is stored (FIG. 17(a)). According to the present embodiment, it is easy to make the shading member 9 closely contact the display screen 101a of the liquid crystal display panel. To move the sensor unit 3 forward or backward in parallel with the main body frame 2, it is only necessary to dispose two or more sliding pins 31 at a predetermined interval(s) on each side of the sensor unit 3 and to form slopes 162 corresponding to the sliding pins 31 one-on-one on the guide member 16. The sliding pins 31 may be rotational roller members.

Figures 19A, 19B, 19C:
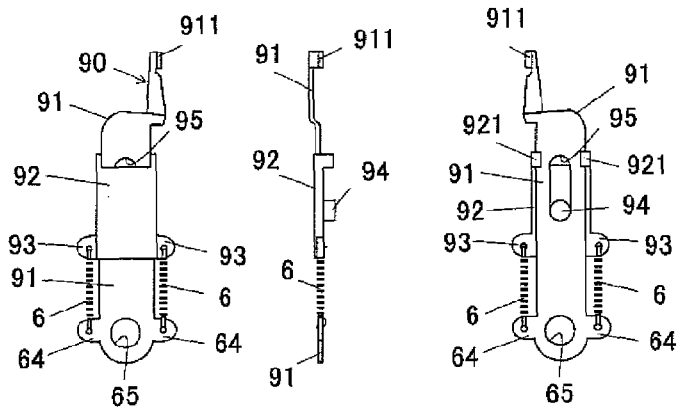
FIG. 19(a) is a rear view seen from inside.
FIG. 19(b) is a side view.
FIG. 19(c) is a front view seen from outside.
Figures 20A, 20B, 20C:
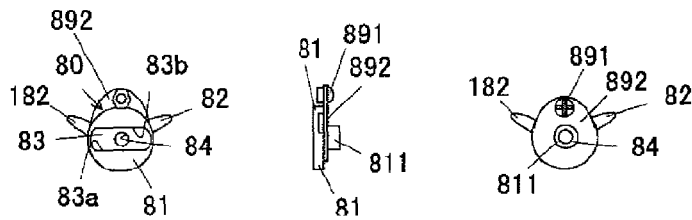
FIG. 20(a) is a rear view seen from inside.
FIG. 20(b) is a side view.
FIG. 20(c) is a front view seen from outside.

In the present embodiment, the drive means for moving the sensor unit 3 includes the movable arm 90, a balance member (rotational member) 80 that is disposed under the movable arm 90 and can be displaced by external force, a first shape-memory alloy wire 15, and a second shape-memory alloy wire 5 (FIG. 2(a)). The rectangular groove (recess) 321 is formed near the back end on the rear surface of the sensor unit 3 (the surface having the optical sensor 108 thereon). The nail 911 at the front end of the main body 91 of the movable arm 90 locks in the recess 321. A hole 65 of the base of the main body 91 is placed on a support (not shown) of the frame 2, and the main body 91 is mounted on the main body frame 2 using a flat washer 972 and a screw 971 through the hole 65. Thus, the movable arm 90 is rotatably supported using the center of the hole 65 of the base of the main body 91 as a rotational center (see FIGS. 2(a) and 19(a)). A cylindrical support 811 is integrally formed under the center of the rotational member 80 serving as a balance member. The rotational member 80 is mounted on the main body frame 2 using a flat washer 852 and a screw 851 through a center hole 84 of the rotational member 80. The rotational member 80 is rotatably supported using the center of the center hole 84 of the rotational member 80 as a rotational center (see FIGS. 11(a) and 20(a)). The first shape-memory alloy wire 15 and the second shape-memory alloy wire 5 are made of the same material and have the same dimensions.

Figure 8:
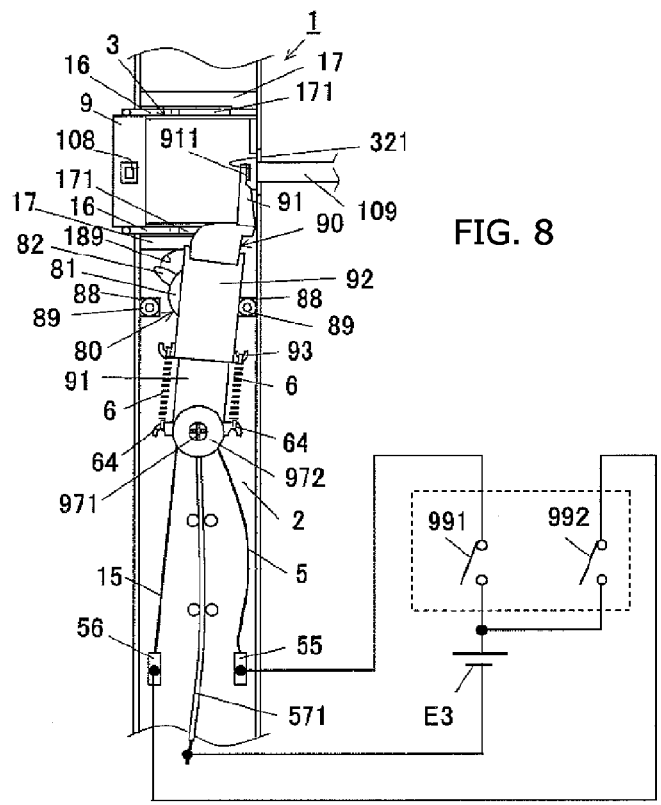
FIG. 8 is a diagram showing a state where first and second shape-memory alloy wires of the first embodiment are de-energized and the sensor unit is stored.
Figure 10:
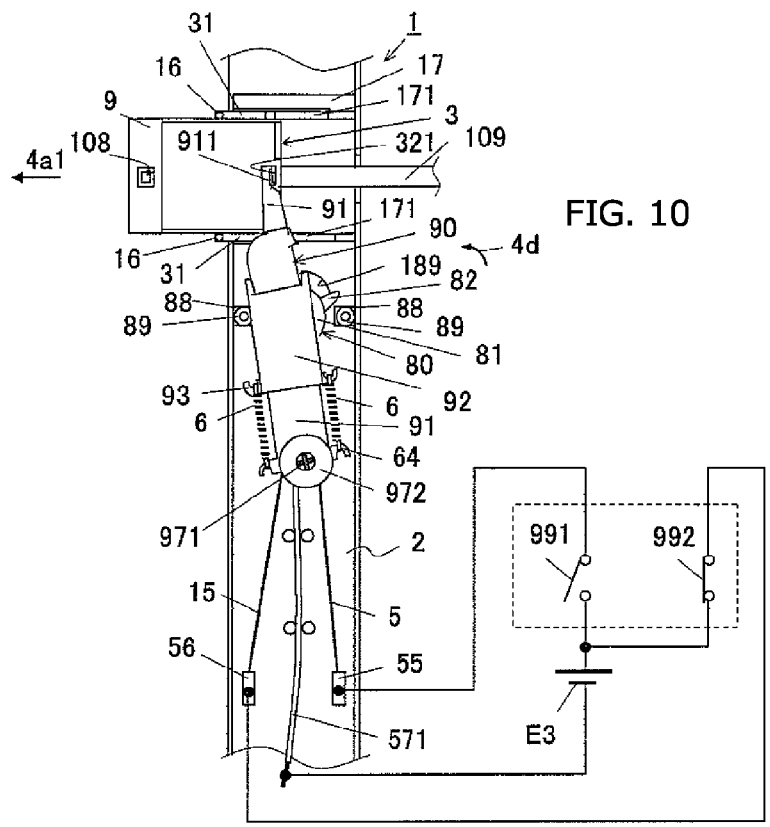
FIG. 10 is a diagram showing a state where the first shape-memory alloy wire of the shape-memory alloy wires of the first embodiment is immediately before de-energized.
Figure 11:
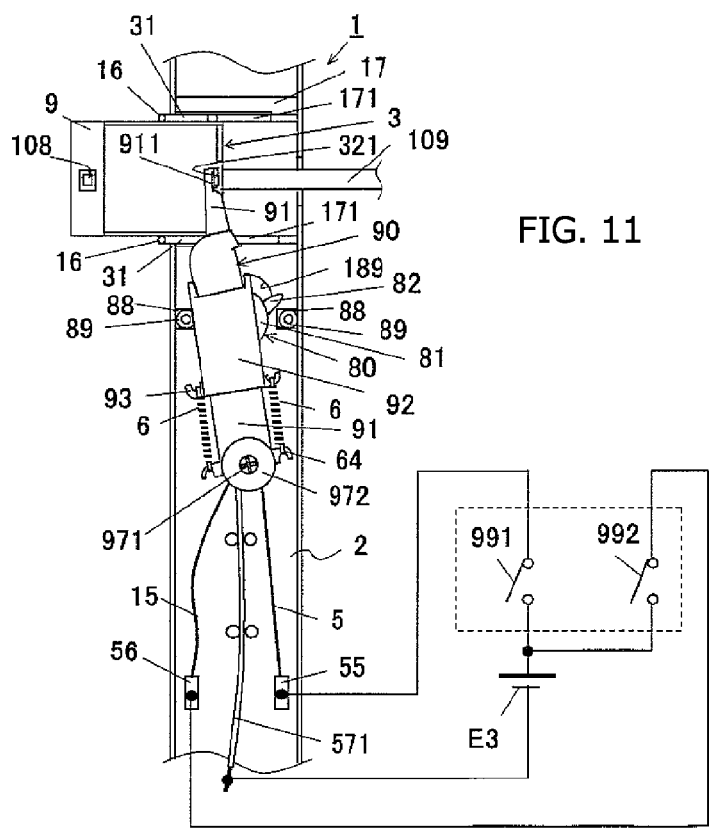
FIG. 11 is a diagram showing a state where the first shape-memory alloy wire of the shape-memory alloy wires of the first embodiment has been de-energized and the sensor unit has been moved to the measurement position on the screen.

The movable arm 90 and the rotational member 80 are coupled together in such a manner that an operation of one of them is transmitted to the other with a short delay. Operations thereof will be detailed later. That is, the movable arm 90 and the rotational member 80 are coupled together in such a manner that an operation of the movable arm 90 causes an operation of the rotational member 80 with a delay, and vice versa. A combination of the set of shape-memory alloy wires 5, 15, the movable arm 90, and the rotational member 80, and the sensor unit 3 allows the sensor unit 3 to move obliquely leftward (in the direction of reference numeral 4a1) in FIG. 10 toward the display screen 101a when the first shape-memory alloy wire 15 contracts, causing the shading member 9 to contact the display screen 101a (see FIG. 7(b)). The first shape-memory alloy wire 15 is vertically contracted in FIG. 10 compared to that in FIG. 8, and is loosened in FIG. 11 compared to that in FIG. 10. When the second shape-memory alloy wire 5 contracts, the sensor unit 3 moves back obliquely rightward (in the direction of reference numeral 4b1) away from the display screen 101a and is stored in the main body frame 2 in FIG. 13 (see FIG. 7(c)). The second shape-memory alloy wire 5 is vertically contracted in FIG. 13 compared to that in FIG. 11, and is loosened in FIG. 8 compared to that in FIG. 13.

Figures 21A, 21B, 21C:
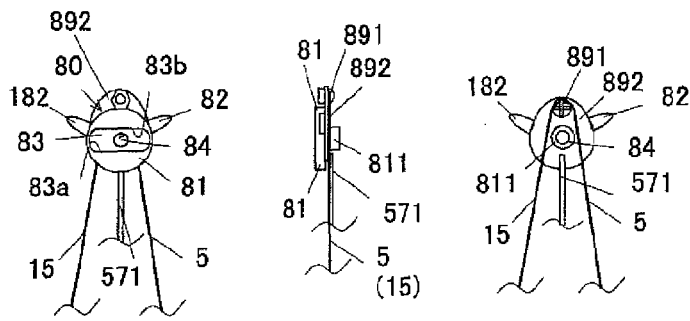
FIG. 21(a) is a rear view seen from inside.
FIG. 21(b) is a side view.
FIG. 21(c) is a front view seen from outside.
Figures 22A, 22B, 22C:
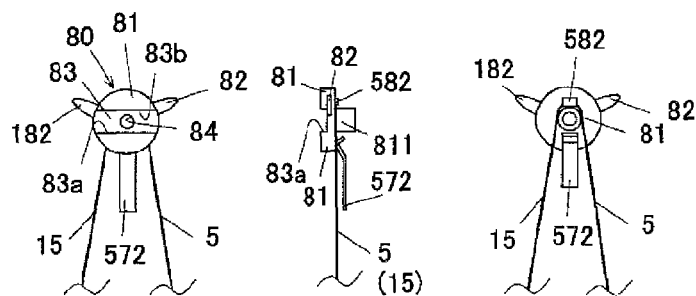
FIG. 22(a) is a rear view seen from inside.
FIG. 22(b) is a side view.
FIG. 22(c) is a front view seen from outside.

FIG. 19 includes structural diagrams illustrating the movable arm 90. FIG. 20 includes structural diagrams illustrating the rotational member 80. FIG. 21 and FIG. 22 include structural diagrams illustrating the disposition of the rotational member 80, the first shape-memory alloy wire 15, and the second shape-memory alloy wire 5. The movable arm 90 and the rotational member 80 will be described below.

The main body 91 of the movable arm 90 is formed by press molding a planar metal member. A plastic slider 92 is inserted into the main body 91 in such a manner that the slider 92 can slide vertically in a predetermined range (FIG. 19). Formed on the left and right of the base of the main body 91 are hooks 64. Formed on the left and right side of the base of the slider 92 are hooks 93. In the present embodiment, two return springs (extension springs) 6 forming a pair are hung on the left hooks 93 and 64 and the right hooks 93 and 64, respectively, and both return springs 6 pull the slider 92 toward the base of the movable arm 90 by their resilience. Formed in the center of the main body 91 of the movable arm 90 is a longitudinally long, rectangular groove 95 having rounded corners. Formed in the center of the slider 92 is a cylindrical link pin 94 which is oriented toward the front surface. The link pin 94 is inserted into the groove 95 in such a manner that the slider 92 can slide vertically in the vertical range of the longitudinally long groove 95 (FIG. 19).

The rotational member 80 has a linear, laterally long groove 83 which laterally traverses a plastic disc main body 81. The disc main body 81 has a pair of protrusions 182, 82 which protrude from the left and right side surfaces in upper-left and upper-right directions (in the directions of 10 and 2 o'clock of the hour hand of a clock), respectively. When one of the protrusions 182, 82 contacts the corresponding one of two stoppers 88 disposed on the frame 2, the rotational member 80 is prevented from rotating beyond the stopper 88 (see FIG. 24). The rotational member 80 is provided with, in the center thereof, a cylindrical support 811 which is integrally formed therewith and oriented toward the front surface, and also has a conductive, longitudinally long, oval metal washer 892 fitted into the front surface thereof (FIG. 20(*c*)).

FIG. 21 includes structural diagrams illustrating the disposition of the rotational member 80, the first shape-memory alloy wire 15, and the second shape-memory alloy wire 5. The main body 81 of the rotational member 80 is disposed between the first shape-memory alloy wire 15 and the second shape-memory alloy wire 5. Ends of the first and second shape-memory alloy wires 15, 5 are fixed by a screw 891 on the upper portion of the metal washer 892 and electrically coupled together. In practice, a single shape-memory alloy wire 5 is fixed by the screw 891 at the midpoint thereof and thus electrically coupled to the rotational member 80, and used functionally as first and second shape-memory alloy wire 15 and 5. Thus, the assembly work becomes easy and reasonable. Subsequently, a flexible wire 571 is electrically coupled to a lower portion of the metal washer 891, thereby energizing the rotational member 80. The shape-memory alloy wire 5 (15) and the metal washer 891 may be fixed together by any fixing method, as long as the fixing method ensures firm fixation and reliable electrical connection between both. Available methods include soldering, brazing, screwing, swaging, and press contact fixing. According to the present embodiment, the head of the screw 891 is inserted into a fan-shaped window hole 189 formed in the main body frame 2 and moved side-to-side. Accordingly, the fan-shaped window hole 189 also confines the allowable motion range of the rotational member 80 within a predetermined range (FIG. 3(*c*)).

FIG. 22 includes structural diagrams showing another example of the disposition of the rotational member 80, the first shape-memory alloy wire 15, and the second shape-memory alloy wire 5. In an example shown in FIG. 22, the rotational member 80 is made of a metal. A single shape-memory alloy wire 5 is passed through a metal tube 582 and swaged at a midpoint thereof (with the joints brought into close contact with each other using a tool). The metal tube 582 is then fitted and fixed into a recess formed in an upper portion of the disc main body 81 of the rotational member 80. The shape-memory alloy wire 5 and the rotational member 80 are then electrically coupled together using contact, soldering, or the like. Subsequently, the front end of a lead electrode 572 which is bent in an L-shaped form and has a flat spring structure is press-contacted with a lower portion of the disc main body 81 of the rotational member 80. Thus, the first and second shape-memory alloy wires 15 and 5 are energized. According to the present embodiment, the position of the lead electrode 572 is kept constant even when the rotational member 80 rotates. Thus, it is possible to maintain stable electrical connection and obtain an electrode lead structure having higher operation reliability.

FIG. 23 includes structural diagrams showing other examples of the disposition of the rotational member 80, the first shape-memory alloy wire 15, and the second shape-memory alloy wire 5. In an example shown in FIG. 23(*a*), the shape-memory alloy wires 15, 5 are mounted on left and right predetermined positions of the disc 81 having the laterally long groove 83, and the disc 81 is rotated clockwise or counterclockwise by pulling the shape-memory alloy wires 15, 5 alternately. In an example shown in FIG. 23(*b*), the shape-memory alloy wires 15, 5 are mounted on left and right predetermined positions of a triangular plate 81 having the laterally long groove 83, and the triangular plate 81 is rotated clockwise or counterclockwise by pulling the shape-memory alloy wires 15, 5 alternately. In an example shown in FIG. 23(*c*), the shape-memory alloy wires 15, 5 are mounted on left and right predetermined positions of a rectangular plate 81 having the laterally long groove 83, and the rectangular plate 81 is rotated clockwise or counterclockwise by pulling the shape-memory alloy wires 15, 5 alternately. That is, the rotational member 80 of the present invention may have any shape, as long as the laterally long groove 83 is formed in the rotational member 80; ends of the shape-memory alloy wires 5, 5 are fixed to predetermined left and right positions of the rotational member 80; and the rotational member 80 is rotated clockwise or counterclockwise by pulling the shape-memory alloy wires 15, 15 alternately. Shapes of the rotational member 80 include a disc, a triangular plate, and a rectangular plate.

FIG. 24 and FIG. 25 include structural diagrams illustrating the interlocking relationship between the main body 81 of the rotational member 80 and the slider 92 of the movable arm 90. In the present embodiment, the link pin 94 of the slider 92 is inserted into the laterally long groove 83 of the disc main body 81 and makes a movement. Thus, the movable arm 90 and the rotational member 80 are coupled together in such a manner that an operation of one of them is transmitted to the other with a short delay.

FIG. 24(*a*) is a diagram showing the interlocking relationship between the disc main body 81 and the slider 92 when the second shape-memory alloy wire 5 is de-energized and the sensor unit 3 is stored. The link pin 94 of the slider 92 is placed on a sidewall 83*a* of the laterally long groove 83 of the disc main body 81. When clockwise rotation of the disc main body 81 causes the right protrusion 82 of the disc main body 81 to contact and stop at the stopper 88 disposed on the right side of the frame 2, the laterally long groove 83 of the disc main body 81 is inclined rightward, thereby locating the link pin 94 of the slider 92 in the lower-right portion of the laterally long groove 83. Thus, the slider 92 moves in the lower-right direction, contacting a stopper pin 89. At this time, the pair of return springs 6 contracts and restores its original state.

FIG. 24(*b*) is a diagram showing the positional relationship when the first shape-memory alloy wire 15 is being energized. When the first shape-memory alloy wire 15 is energized and thus starts contracting, the disc main body 81 rotates counterclockwise and the laterally long groove 83 of the disc main body 81 becomes horizontal. Thus, the link pin 94 of the slider 92 comes close to the center of the laterally long groove 83, so that the pair of return springs 6 is pulled and extended. Until this point in time, the slider 92 moves only upward (in the direction of reference numeral 4*f*).

FIG. 24(*c*) is a diagram showing the positional relationship when the first shape-memory alloy wire 15 has been de-energized. When the first shape-memory alloy wire 15 is energized and thus contracts, the disc main body 81 further rotates counterclockwise. Thus, the laterally long groove 83 of the disc main body 81 is inclined leftward and the pair of return springs 6 contracts due to its resilience (although the left spring 6 first contracts and the right spring 6 then contracts, both springs moves almost simultaneously). Thus, the link pin 94 of the slider 92 slides down to a lower-left position of the laterally long groove 83 without stopping, and the disc main body 81 rapidly rotates counterclockwise. Thus, the movable arm 90 is significantly inclined leftward. Thus, the sensor unit 3, coupled to the nail 911 at the front end of the main body 91 of the movable arm 90, is extruded from the frame 2 leftward and moved forward to a measurement position. At this time, the slider 92 moves in a direction obtained by combining the downward direction (the direction of reference numeral 4g) and the leftward direction (the direction of reference numeral 4a). The counterclockwise rotation of the disc main body 81 causes the left protrusion 182 of the disc main body 81 to contact and stop at the stopper 88 disposed on the left side of the frame 2. The slider 92 moves in the lower-left direction, contacting the stopper pin 89. At this time, the pair of return springs 6 contracts and restores its original state. To store, in the frame 2, the sensor unit 3 (FIG. 25(a)) extruded over the screen 101, the second shape-memory alloy wire 5 is energized to rotate the disc main body 81 clockwise (FIG. 25(b)) and to cause the rotational member 80 and the movable arm 90 to perform operations reverse to the above operations. Thus, the sensor unit 3 is pulled back and stored into the frame 2 (FIG. 25(c)). The operation procedure of the sensor unit 3 will be described below.

FIG. 8 shows a state where the sensor unit 3 is stored in the frame 2. As described above, the ends of the first and second shape-memory alloy wires 15, 5 are fixed and electrically coupled to a fastener 891 above the rotational member main body 81 and thus electrically coupled to the flexible wire 571. The other end of the second shape-memory alloy wire 5 is electrically coupled to an electrode terminal 55, which is then electrically coupled to the positive side of a direct-current power supply E3 via a switch 991. The other end of the first shape-memory alloy wire 15 is electrically coupled to an electrode terminal 56, which is then electrically coupled to the positive side of a direct-current power supply E3 via a switch 992. The negative side of the direct-current power supply E3 is electrically coupled to the flexible wire 571. The switches 991 and 992 are configured not to be turned on simultaneously, that is, configured such that one of the switches 991 and 992 is turned on or both are turned off. Accordingly, one of the first and second shape-memory alloy wires 15 and 5 is energized, or none of these shape-memory alloy wires is energized. The shape-memory alloy wires 15, 5 of the present embodiment have no polarity and therefore operate regardless of which of the upper and lower sides of the direct-current power supply E3 shown in FIG. 8 is positive.

Figure 9:
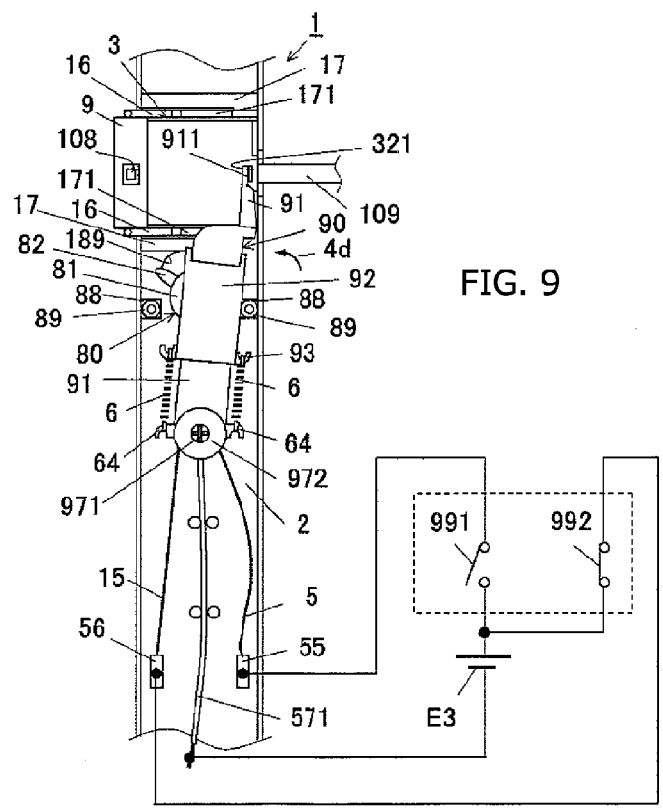
FIG. 9 is a diagram showing a state where the first shape-memory alloy wire of the shape-memory alloy wires of the first embodiment is being energized.

By turning on the switch 992, the first shape-memory alloy wire 15 is energized and contracts against the tensile force of the return springs 6. Thus, as described above, the rotational member 80 rotates counterclockwise (in the direction of reference numeral 4d), and the sensor unit 3, coupled to the movable arm 90, is extruded leftward (in the direction of reference numeral 4a1) (FIGS. 9 and 10). When the rotational member 80 further rotates counterclockwise, the sensor unit 3, coupled to the movable arm 90, moves obliquely forward out of the frame 2 to a measurement position on the monitor screen 101 (FIG. 10). Then, the optical sensor 41 is enabled to measure the luminance, chromaticity, or the like of the monitor screen 101. At the point in time when the sensor unit 3 reaches the measurement position, the switches 991 and 992 are turned off. The first shape-memory alloy wire 15 cools down due to heat dissipation and thus restores its original length (FIG. 11).

Figure 12:
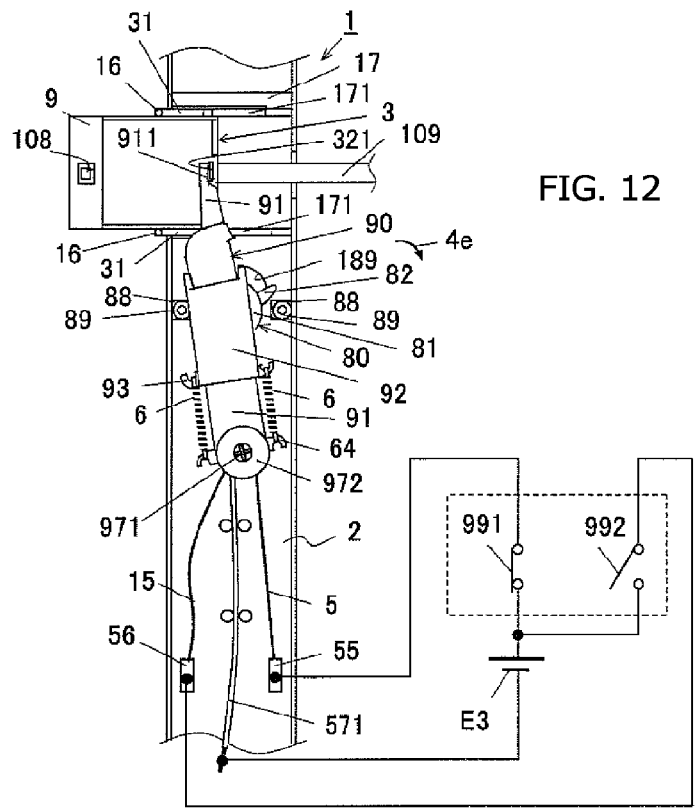
FIG. 12 is a diagram showing a state where the second shape-memory alloy wire of the shape-memory alloy wires of the first embodiment is being energized.

After the optical sensor 41 measures the luminance, chromaticity, or the like of the monitor screen 101, the switch 991 is turned on to energize the second shape-memory alloy wire 5. Thus, the rotational member 80 rotates clockwise (in the direction of reference numeral 4e), and the rotational member 80 and the movable arm 90 perform operations reverse to the operations they have performed when extruding the sensor unit 3 (FIG. 12). Thus, the sensor unit 3 moves rightward (in the direction of reference numeral 4b1) and is pulled back and stored into the frame 2 (FIG. 13). At the point in time when the sensor unit 3 is stored, the switches 991 and 992 are turned off. The second shape-memory alloy wire 5 cools down due to heat dissipation and thus restores its original length (FIG. 8).

According to the present embodiment, the shape-memory alloy wires (first shape-memory alloy wire 15 and second shape-memory alloy wire 5) employ a system which does not directly drive the sensor unit 3. Accordingly, even when the shape-memory alloy wires 5, 15 are affected by heat dissipation from the monitor screen 101, the link pin 94 of the slider 92 does not cross the center of the laterally long groove 83 of the disc main body 81, which serves as the boundary between one side and the other side, as described above, until these shape-memory alloy wires contract somewhat. Accordingly, the sensor unit 3 does not start moving until then. As seen above, consideration is given so that the sensor unit 3 does not easily malfunction due to heat. In the actual liquid crystal monitor 1, the temperature around the liquid crystal display panel 101 may rise from room temperature up to around 50° C., and the shape-memory alloy wires (the first shape-memory alloy wire 15 and the second shape-memory alloy wire 5) are easily affected by heat. Accordingly, these shape-memory alloy wires may not expand smoothly in a short time even after they are de-energized. In the present embodiment, when the temperature is high, the energized shape-memory alloy wire forcefully pulls, by contraction force thereof, the entire other shape-memory alloy wire, which has not expanded fully, thereby rotating the disc main body 81. As seen above, a stable operation is obtained. In the present embodiment, a shape-memory alloy wire which, when energized, generates Joule heat having a temperature sufficiently higher than that around the monitor screen 101 is selected as the shape-memory alloy wire 5 (15). Specifically, a shape-memory alloy wire which contracts at a temperature of about 70° C. and expands at a temperature of about 60° C. is used. Further, a large-diameter shape-memory alloy wire which contracts against the tensile force of the return springs 6 with an allowance is selected. For example, a shape-memory alloy wire having a diameter of about 0.2 mm is used. Further, when the sensor unit 3 is held in the measurement position or when the sensor unit 3 is back in its original position, the shape-memory alloy wires 5, 15 are de-energized. For this reason, the optical sensor device 1 can be said to be energy-saving and have high operation reliability.

Figure 14:
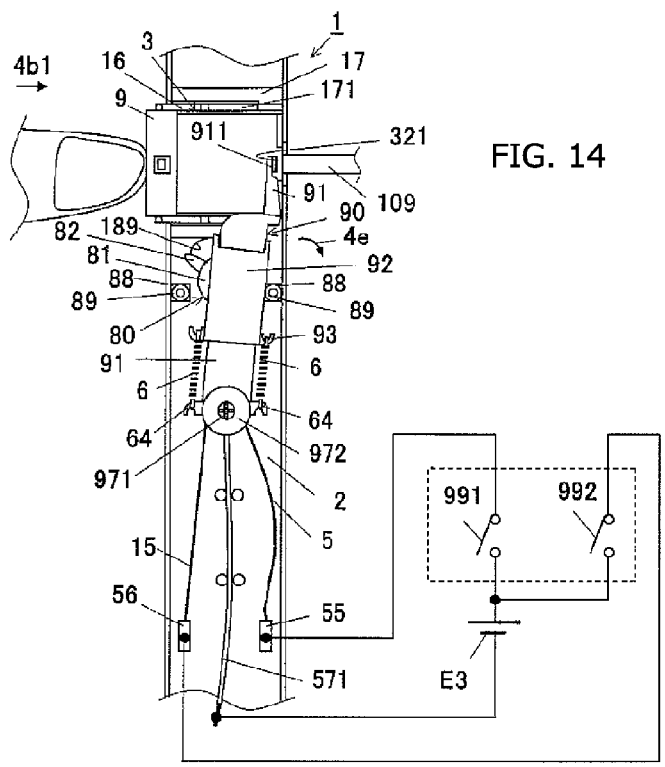
FIG. 14 is a diagram showing an operation when a child or the like pushes back the sensor unit with the first shape-memory alloy wire of the shape-memory alloy wires of the first embodiment de-energized.

FIG. 14 shows an operation when a child or the like attempts to push back the sensor unit 3 which is held in the measurement position, in the direction of reference numeral 4b1 out of curiosity. The shape-memory alloy wires 5, 15 are de-energized. When the sensor unit 3 is pushed back rightward (in the direction of reference numeral 4b1), the rotational member 80 is rotated in the reverse direction by the link pin 94 of the slider 92. Thus, the rotational member 80 and the movable arm 90 perform operations reverse to the operations they have performed when extruding the sensor unit 3, and the sensor unit 3 moves rightward (in the direction of reference numeral 4b1) and is stored in the frame 2. That is, assume that a child or the like attempts to apply an external force to the sensor unit 3 by pushing it back with a finger. If he or she pushes the sensor unit 3 only slightly, he or she feels the resistance of the return springs 6. Accordingly, if he or she releases the finger from the sensor unit 3 at this point in time, the sensor unit 3 remains extruded over the measurement position. On the other hand, if the child or the like further pushes the sensor unit 3 and thus the link pin 94 of the slider 92 goes beyond the position of the center hole 84 of the rotational member 80, the sensor unit 3 is pulled and stored into the frame 2. This eliminates the possibility that the external force may work directly on the de-energized shape-memory alloy wires 5, as a load. For this reason, the optical sensor device 1 can be said to have high operation reliability.

Figure 18:
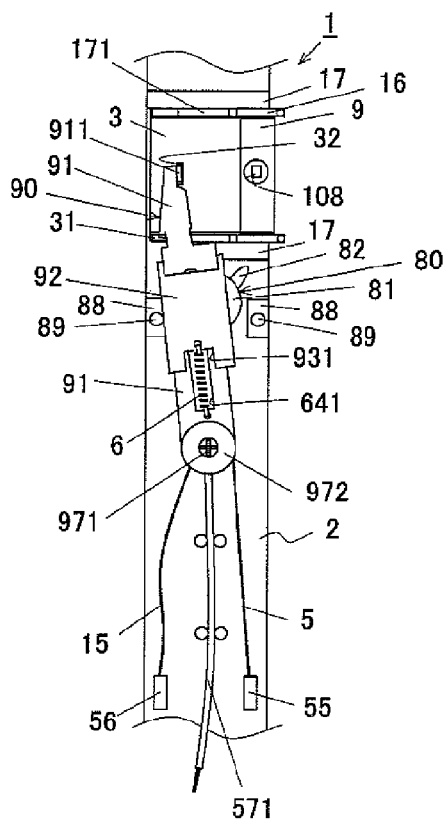
FIG. 18 is a structural diagram showing another example of the optical sensor device of the first embodiment and is a rear view seen from inside.

FIG. 18 is a structural diagram showing another example of the optical sensor device 1 of the above embodiment and is a rear view seen from inside. The same reference numerals denote the same functions and therefore description thereof will be omitted as appropriate. In the present embodiment, the main body 91 of the movable arm 90 has a longitudinally long, rectangular groove 641, and a single return spring 6 pulls the slider 92 toward the base of the movable arm 90 by its resilience.

Second Embodiment

FIGS. 26 and 27 include structure diagrams illustrating an optical sensor device 1 of a second embodiment of the present invention. FIG. 26 shows a state in which the sensor unit is stored; FIG. 27 shows a state in which the sensor unit is extruded over the screen. FIGS. 26(a) and 27(a) are rear views seen from inside, FIGS. 26(b) and 27(b) side views, FIGS. 26(c) and 27(c) front views seen from outside, and FIGS. 26(d) and 26(d) sectional views schematically showing A-A sections. The same reference numerals denote the same functions and therefore description thereof will be omitted as appropriate.

In the optical sensor device 1 of the present embodiment, a rectangular, planar sensor unit 3 is disposed in a bezel (frame) 2. Guide members 16 configured to guide the sensor unit 3 are formed on both sides of the sensor unit 3 (on the upper and lower sides thereof in FIG. 26(a)) as integrated with the main body frame 2 (FIG. 26(b)). The guide members 16 have a guide rail function. Each guide member 16 has, on a front part thereof (on the side of the main body frame 2 from which the sensor unit 3 is extruded), a slope 162 extending toward a display screen 101a of the image display panel (FIG. 26(d)). A pair of arcuate members 7 serving as balance members is disposed on both sides of the sensor unit 3. Each arcuate member 7 includes an arcuate portion 71 which is remote from the sensor unit 3 and a trapezoidal portion 72 which is adjacent to the sensor unit 3. A recess formed in the trapezoidal portion 72 and the corresponding guide member 16 on the frame 2 form a slide guide for receiving a corresponding planar slide member (slide rail) 31 (FIG. 26(d)). That is, the pair of arcuate members 7 interposes both sides of the sensor unit 3, thereby supporting the sensor unit 3 in such a manner that the sensor unit 3 can slide.

The sensor unit 3 includes an optical sensor 108 used to measure a physical quantity of the image display panel 101, such as luminance or chromaticity, and a circuit board for processing a signal from the optical sensor 108. In the present embodiment, the optical sensor 108 is included in the sensor unit 3 and receives light from the image display panel 101 via a round window formed in the sensor unit 3 and performs signal processing on the light (see FIG. 26(a)).

The sensor unit 3 is provided with, on both sides of the rear end thereof (the left end thereof in FIG. 26(a)), hooks 62 for hanging ends of the return springs 6. Hooks 61 for hanging the other ends of the return springs 6 are formed in positions on the frame 2 slightly behind the rear end of the sensor unit 3. In the present embodiment, the return springs 6 forming a pair are each hung on the corresponding hooks 61 and 62 and simultaneously pull back and store the sensor unit 3 into the frame 2 by their resilience.

The sensor unit 3 is also provided with, in the center of the rear end thereof, a hook 32 and hooks 33 for hanging the shape-memory alloy wire 5 serving as an actuator and passing it therethrough (FIG. 26(a)). The hook 32 has a groove in the rear surface thereof. Similarly, the hooks 33 have grooves in the front surfaces thereof. The shape-memory alloy wire 5 is hung on the groove of the centered hook 32 and the grooves of the hooks 33 disposed on both sides of the hook 32 and is passed through these grooves. Thus, the hooks 32 and 33 interpose the shape-memory alloy wire 5 and support it in such a manner that the shape-memory alloy wire 5 can move. The shape-memory alloy wire 5 of the present embodiment is composed of a single wire.

Coupled to both ends of the shape-memory alloy wire 5 are electrode terminals 51. The electrode terminals 51 are screwed on electrodes 511 disposed at the tips of arcuate portions, which are remote from the sensor unit 3, of the arcuate members 7 (FIG. 26(a)). The frame 2 has circular recesses 512. Cylindrical protrusions under the electrodes 511 can move in the circular recesses 512 in such a manner to draw an arcuate trajectory. Both ends of the shape-memory alloy wire 5 are fixed to the electrodes 511 which are located in positions remote from the sensor unit 3 on a line passing through a middle or front portion of the sensor unit 3. The center of the shape-memory alloy wire 5 is supported by the rear end of the sensor unit 3. When the shape-memory alloy wire 5 is de-energized, the sensor unit 3 is disposed inside the frame 2 as if a bow were bent (FIG. 26(a)).

FIG. 28 is a diagram showing a state where the single shape-memory alloy wire 5 included in the optical sensor device 1 of the second embodiment is being energized. In an example shown in FIG. 28, a line drawn from one electrode terminal 51 is coupled to a switch 98, a line from the switch 98 is coupled to the positive side of a direct-current power supply E1, and a line from the negative side of the direct-current power supply E1 is coupled to the other electrode terminal 51. Since the shape-memory alloy wire 5 of the present embodiment has no polarity, the upper side of the direct-current power supply E1 shown in FIG. 28 may be positive, or the lower side thereof may be positive. The temperature around the monitor screen 101 of the operating liquid crystal display device 1 may increase from room temperature up to around 50° C. Accordingly, to prevent the shape-memory alloy wire from malfunctioning due to the temperature, it is necessary to select a shape-memory alloy wire which, when energized, generates Joule heat having a temperature sufficiently higher than that around the monitor screen. In the present embodiment, for example, a shape-memory alloy wire which contracts at a temperature of about 70° C. and expands at a temperature of about 60° C. is used.

By turning on the switch 98, the shape-memory alloy wire 5 is energized and thus contracts against the tensile force of the return springs 6. The sensor unit 3 then moves in the direction of reference numeral 4a1 and protrudes obliquely from the frame 2. Thus, the sensor unit 3 is enabled to measure the luminance, chromaticity, or the like of the image display panel 101 and then makes a measurement using the optical sensor 108 (FIG. 28). Specifically, the slide members 31 slide on the slopes 174 of the trapezoidal portions 72 of the arcuate members 7 and the slopes 162 of the guide members 16 (FIG. 26(d)), and the sensor unit 3 moves obliquely forward along the slopes 174 and 162 (FIG. 27(d)).

Figure 29:
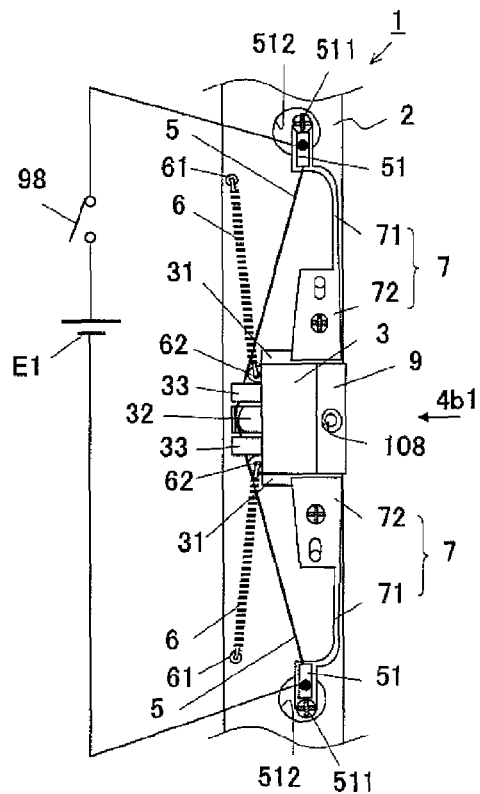
FIG. 29 is a diagram showing a state where the shape-memory alloy wire of the second embodiment is de-energized and the sensor unit is stored.

After the optical sensor 108 completes the measurement, the switch 98 is turned off to de-energize the shape-memory alloy wire 5. Due to heat dissipation, the shape-memory alloy wire 5 cools down to around usual ambient temperature thereof and restores its original length. Accordingly, the sensor unit 3 is simultaneously pulled by the tensile force of the pair of return springs 6 in the direction of reference numeral 4b1 and is moved back into the frame 2 (FIG. 29).

Figure 30:
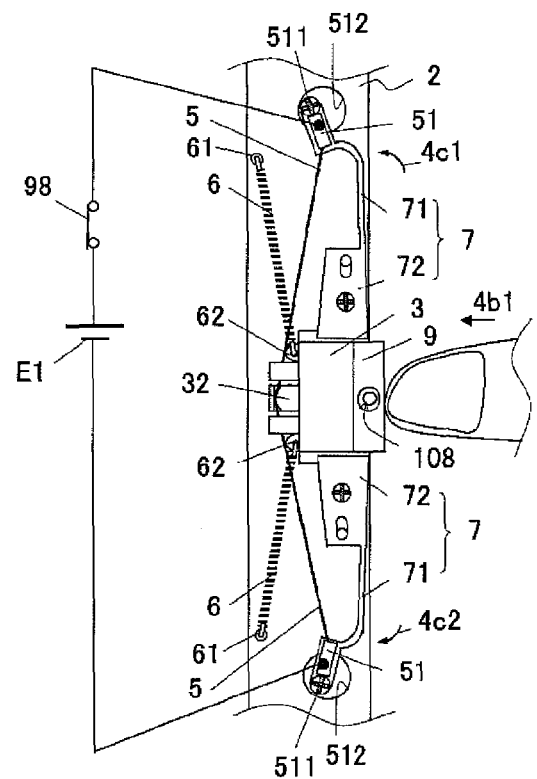
FIG. 30 is a diagram showing an operation when a child or the like pushes back the sensor unit with the shape-memory alloy wire of the second embodiment energized.
Figure 31:
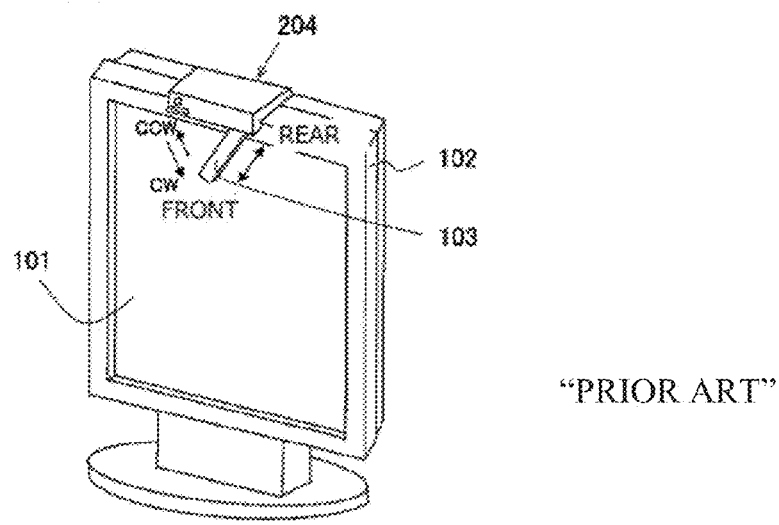
FIG. 31 is a perspective view illustrating a state in which a traditional optical sensor device is mounted on an image display device.
Figure 32:
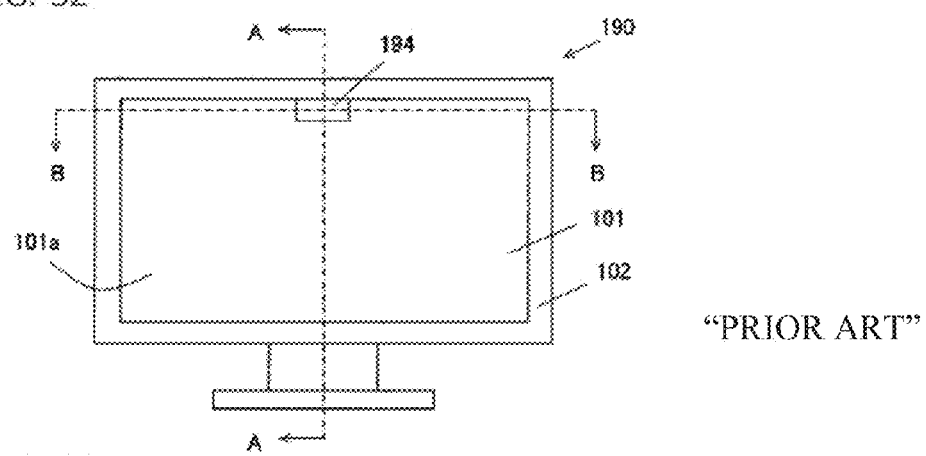
FIG. 32 is a front view illustrating the disposition of a traditional optical sensor unit in an image display device.
Figure 33:
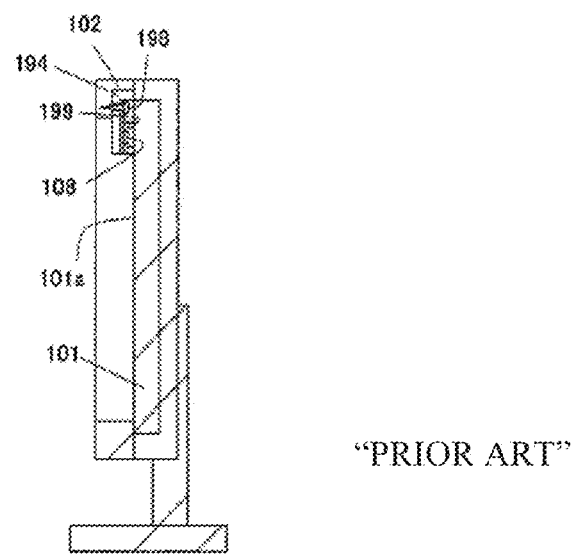
FIG. 33 is an A-A sectional view showing the disposition of the traditional optical sensor unit.

FIG. 30 shows an operation when a child or the like attempts to push back the sensor unit 3 in the direction of reference numeral 4b1 with a finger. Assume that the switch 98 is turned on to energize the shape-memory alloy wire 5, followed by the extrusion of the sensor unit 3 from the frame 2 and that a child or the like attempts to push back the extruded sensor unit 3 in the direction of reference numeral 4b1. In this case, even a relatively weak force causes the sensor unit 3 to slide and be pushed back to the original position, since the tensile force of the pair of return springs 6 is working on the sensor unit 3. At this time, since the shape-memory alloy wire 5 is energized and contracted, the pair of arcuate members 7 is bent in the direction of reference numeral 4c1, then the external force from the child or the like is relaxed. Accordingly, a direct load is not easily put on the energized shape-memory alloy wire 5.

The present invention is not limited to the above embodiments. For example, the shape-memory alloy wires 15, 5 may have any shape, including planar, coiled, spiral, cylindrical, and prismatic shapes, as long as they serve as actuators which, when energized, contract against the resilience of the spring members. The drive means of the present invention need not necessarily use the shape-memory alloy wires 15, 5 and may use a motor, solenoid, or the like. For example, by combining a wire, a pulley, and a motor (or solenoid) together, the wire is wound about the pulley so that the wire is apparently contracted, or the wire is pulled out from the pulley so that the wire is apparently expanded. In this way, the combination can operate similarly with the shape-memory alloy wires 5 and 15. The disposition or the like of the sensor unit 3 may be changed freely and multiple sensor units 3 may be disposed. If the shape-memory alloy wires 5, 15 are used as the actuators described above, any of direct current and alternating current may be passed through the actuators. The optical sensor device 1 of the present invention may be incorporated into a monitor which is being assembled, or may be incorporated into an assembled monitor. The present invention can be applied to various types of image display monitors, including liquid crystal display devices, organic EL display devices, and plasma display devices. In addition, the invention can be used to measure various types of physical quantities, as long as there are provided the frame 2 disposed in the frame region around the object to be measured and the sensor unit 3 including the optical sensor 108 for measuring a physical quantity of the object to be measured. As seen above, changes can be made to the present invention as appropriate without departing from the spirit and scope of the invention.

EXPLANATION OF REFERENCE NUMERALS

1: optical sensor device
2: main body frame (bezel)
3: sensor unit
31: slide member
5, 15: actuator (shape-memory alloy wire)
6: return spring
9: shading member
16: guide member
162: slope
171: elastic body (flat spring)
108: optical sensor
7: balance member (arcuate member)
80: balance member (rotational member)
90: movable arm
91: movable arm main body
92: slider
E1, E2, E3: direct-current power supply
100: image display device (liquid crystal display device)
101: image display panel (liquid crystal screen)

The invention claimed is:

1. An optical sensor device comprising:
a main body frame disposed in a frame region around an image display panel;
an optical sensor used to measure luminance, or chromaticity of the image display panel;
a sensor unit including the optical sensor;
a guide member configured to guide the sensor unit; and
drive means configured to move the sensor unit to a measurement position, wherein
the sensor unit is extruded by the drive means, approaches a display screen of the image display panel while being guided by the guide member, makes a measurement, and is subsequently pulled back and stored into the frame by the drive means,
the guide member has, on a front portion thereof, a slope extending toward the display screen of the image display panel, and
the sensor unit moves forward along the slope and approaches the display screen.

2. The optical sensor device of claim 1, wherein
the sensor unit is provided with, on a surface of a front portion thereof, the surface facing the display screen, a shading member which surrounds the optical sensor and allows light from the display screen to be received by the optical sensor,
the shading member is guided by the guide member, contacts the display screen of the image display panel, and, after a measurement is made, is pulled back away from the display screen by the drive means.

3. The optical sensor device of claim 1, wherein
a slide member configured to slide along the guide member is disposed on both sides of the sensor unit, and an elastic body opposed to the guide member and configured to push the slide member toward the guide member is disposed along both sides of the sensor unit.

4. The optical sensor device of claim 3, wherein
the elastic body is a flat spring, and
when the sensor unit moves obliquely forward and approaches the display screen, a front end of the flat spring pushes a rear portion of the slide member.

5. An image display device comprising the optical sensor device of claim 1.

* * * * *